(12) United States Patent
Rothermel et al.

(10) Patent No.: US 6,948,154 B1
(45) Date of Patent: Sep. 20, 2005

(54) METHODOLOGY FOR TESTING SPREADSHEETS

(75) Inventors: Gregg Evan Rothermel, Albany, OR (US); Margaret Myers Burnett, Corvallis, OR (US); Lixin Li, Annandale, VA (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 09/438,084

(22) Filed: Nov. 10, 1999

Related U.S. Application Data
(60) Provisional application No. 60/125,414, filed on Mar. 22, 1999.

(51) Int. Cl.[7] ................................................ G06F 9/44

(52) U.S. Cl. ........................ 717/128; 717/131; 717/133

(58) Field of Search ................................ 717/124–133; 715/503–510

(56) References Cited

U.S. PATENT DOCUMENTS
6,496,832 B2   12/2002   Chi et al. .................... 707/102

OTHER PUBLICATIONS
Rothermel et al., "What You See Is What You Test: A Methodology for Testing Form–Based Visual Programs", IEEE, pp. 198–207, 4–1998.*
Wilcox et al., "Does continuous visual feedback aid debugging in direct–manipulation programming systems?", ACM, pp. 258–265, 1997.*
A. V. Aho, R. Sethi, and J. D. Ullman. Compilers, Principles, Techniques, and Tools. Addison–Wesley Publishing Company, Reading, MA, 1986. (Aho86).
A. Ambler, M. Burnett, and B. Zimmerman. Operational versus definitional: a perspective on programming paradigms. Computer, 25(9):28–43, Sep. 1992. (Ambler92).
A. Azem, F. Belli, O. Jack, and P. Jedrzejowicz. Testing and reliability of logic programs. In The Fourth International Symposium on Software Reliability Engineering, pp. 318–327, 1993. (Azem93).
F. Belli and O. Jack. A test coverage notion for logic programming. In The 6th International Symposium on Software Reliability Engineering, pp. 133–142, 1995. (Belli95).
P. Brown and J. Gould. Experimental study of people creating spreadsheets. ACM Transactions on Office Information Systems, 5(3):258–272, Jul. 1987. (Brown87).

(Continued)

*Primary Examiner*—Tuan Dam
*Assistant Examiner*—Ted T. Vo
(74) *Attorney, Agent, or Firm*—Marger Johnson & McCollom, P.C.

(57) ABSTRACT

The invention includes a method for testing a spreadsheet cell. Du-associations are collected for the spreadsheet cell. The cell's execution trace is tracked. After the user validates the cell, the du-associations that participated in the execution trace are marked as executed. Du-associations for other cells that are affected by the testing a spreadsheet cell are similarly marking as exercised. If the user changes a cell's contents, the collected du-associations for the cell are discarded and the steps of collecting test elements, tracking execution traces, and marking are repeated. Cells that depend on the changed cell also repeat these steps. After the user marks a cell as validated, a validation symbol is shown on the cell. If the cell's validation status is later brought into question, the validation symbol can change or be removed entirely. The invention also includes a method for providing a user with feedback of the testedness of the spreadsheet cells. The du-associations for each spreadsheet cell are maintained, and the subset of du-associations that have been exercised is identified. Using the numbers of tested and untested du-associations, a testedness measure is calculated for the cell, which is provided to the user.

56 Claims, 17 Drawing Sheets

OTHER PUBLICATIONS

M. Burnett, J. Atwood, and Z. Welch. Implementing level 4 liveness in declarative visual programming languages. In 1998 IEEE Symposium on Visual Languages, Sep. 1998. (Burnett98a).

M. Burnett and H. Gottfried. Graphical definitions: Expanding spreadhseet languages through direct manipulation and gestures. ACM Transactions on Computer–Human Interaction, 5(1):1–33, Mar. 1998. (Burnett98b).

M. Burnett, R. Hossli, T. Pulliam, B. Van Voorst, and X. Yang. Toward visual programming languages for steering in scientific visualization: a taxonomy. IEEE Comp. Science and Engineering, 1(4), 1994. (Burnett94).

E. H. Chi. P. Barry, J. Riedl, and J. Konstan. A Spreadsheet Approach to Information Visualization. In IEEE Symposium on Information Visualization, Oct. 1997. (Chi97).

R. Christ. Review and analysis of color coding research for visual displays. Human Factors, 17(6):542–570, 1975. (Christ75).

L. Clarke. A system to generate test data and symbolically execute programs. IEEE Transactions on Software Engineering, 2(3), Sep. 1976. (Clarke76).

L Clarke, A. Podgurski, D. Richardson, and S. Zeil. A formal evaluation of data flow path selection criteria. IEEE Transactions on Software Engineering, SE–15(11):1318–1332, Nov. 1989. (Clarke89).

C. Cook, K. Rothermel, M. Burnett, T. Adams, G. Rothermel, A. Sheretov, F. Cort, J. Reichwein. Does immediate visual feedback about testing aid debugging in spreadsheet language? TR 99–60–07, Oregon State University, Mar. 1999. (Cook99).

E. Duesterwald, R. Gupta, and M. L. Soffa. Rigorous data flow testing through output influences. In Proceedings of the 2nd Irvine Software Symposium, Mar. 1992. (Duesterwald92)

P. Frankl and S. Weiss. An experimental comparison of the effectiveness of branch testing and data flow testing. IEEE Transactions on Software Engineering, 19(8):774–787, Aug. 1993. (Frankl93).

P. Frankl and E. Weyuker. An applicable family of data flow criteria. IEEE Transactions on Software Engineering, 14(10):1483–1498, Oct. 1988. (Frankl88).

T. Green and M. Petre. Usability analysis of visual programming environments: A 'cognitive dimensions' framework. Journal of Visual Languages and Computing, 7(2):131–174, Jun. 1996. (Green96).

R. Gupta, M. J. Harrold, and M. L. Soffa. Program slicing–based regression testing techniques. Journal of Software Testing, Verification, and Reliability, 6(2):83–112, Jun. 1996. (Gupta93).

M. J. Harrold and M. L. Soffa. An incremental approach to unit testing during maintenance. In Proceedings of the Conference on Software Maintenance, pp. 362–367, Oct. 1988. (Harrold88).

S. Hudson. Incremental attribute evaluation: a flexible algorithm for lazy update. ACM Transactions Programming Languages and Systems, 13(3), Jul. 1991. (Hudson91).

M. Hutchins, H. Foster, T. Goradia, and T. Ostrand. Experiments on the effectiveness of dataflow– and controlflow–based test adequacy criteria. In 16th International Conference on Software Engineering, pp. 191–200, May 1994. (Huitchins94).

W. Kuhn and A. U. Frank. The use of functional programming in the specification and testing process. In International Conference and Workshop on Interoperating Geographic Information Systems, Dec. 1997. (Kuhn97).

J. Laski and B. Korel. A data flow oriented program testing strategy. IEEE Transactions on Software Engineering, 9(3):347–354, May 1993. (Laski83).

J. Leopold and A. Ambler. Keyboardless visual programming using voice, handwriting, and gesture. In 1997 IEEE Symposium on Visual Languages, pp. 28–35, Sep. 1997. (Leopold97).

G. Luo, G. Bochmann, B. Sarikaya, and M. Boyer. Control–flow based testing of Prolog programs. In The 3rd International Symposium on Software Reliability Engineering, pp. 104–113, 1992. (Luo92).

T. Marlowe and B Ryder. An efficient hybrid algorithm for incremental data flow analysis. In ACM Principles of Programming Languages, pp. 184–196, Jan. 1990. (Marlowe90).

G. Murch. Physiological principles for the effective use of color. IEEE Computer Graphics and Applications, pp. 49–54, Nov. 1984. (Murch84).

B. Myers. Graphical techniques in a spreadsheet for specifying user interface. In ACM Conference on Human Factors in Computing Systems, pp. 243–249, Apr. 1991. (Myers91).

S. C. Ntafos. On required element testing. IEEE Transactions on Software Engineering, 10(6), Nov. 1984. (Ntafos84).

J. Offutt, J. Pan, K. Tewary, and T. Zhang. An experimental evaluation of data flow and mutation testing. Software Practice and Experience, 26(2):165–176, Feb. 1996. (Offutt96).

F. Ouabdesselam and I. Parissis. Testing techniques for data–flow synchronous programs. In AADEBUG'95: Second International Workshop on Automated and Algorithmic Debugging, May 1995. (Ouabd95).

R. Panko and R. Halverson. Spreadsheets on trial: A survey of research on spreadheet risks. In Twenty–Ninth Hawaii International Conference on System Sciences, Jan. 1996. (Panko96).

D. Perry and G. Kaiser. Adequate testing and object–oriented programming. Journal of Object–Oriented Programming, 2, Jan. 1990. (Perry90).

L. Pollock and M. L. Soffa. An incremental version of iterative data flow analysis. IEEE Transactions on Software Engineering, 15(12):1537–1549, Dec. 1989. (Pollock89).

S. Rapps and E. J. Weyuker. Selecting software test data using data flow information. IEEE Transactions on Software Engineering, 11(4):367–375, Apr. 1985. (Rapps85).

G. Rothermel and M. J. Harrold. Selecting tests and identifying test coverage requirements for modified software. In Proceedings of the 1994 International Symposium Software Testing and Analysis, pp. 169–184, Aug. 1994. (Rothermel94).

G. Rothemel and M.J. Harrold. A safe, efficient regression test selection technique. ACM Transactions on Software Engineering and Methodology, 6(2):173–210, Apr. 1997. (Rothermel97a).

G. Rothermel, L. Li, and M. Burnett. Testing strategies for form–based visual programs. In The Eighth International Symposium on Software Reliability Engineering, pp. 96–107, Nov. 1997. (Rothermel97b).

B. Shneiderman. Designing the User Interface. Addison–Wesley, Reading, MA, 3rd edition, 1998. (Schneiderman98).

T. Smedley, P. Cox, and S. Byrne. Expanding the utility of spreadsheets through the integration of visual programming and user interface objects. In Advanced Visual Interfaces '96, May 1996. (Smedley96).

G. Viehstaedt and A. Ambler, Visual representation and manipulation of matrices. Journal of Visual Languages and Computing, 3(3):273–298, Sep. 1992. (Viehstaedt92).

E. J. Weyuker, Axiomatizing software test data adequacy. IEEE Transactions on Software Engineering, 12(12):1128–1138, Dec. 1986. (Weyuker86).

E.J. Weyuker. More experience with dataflow testing. IEEE Transactions on Software Engineering, 19(9), Sep. 1993. (Weyuker93).

E. Wilcox, J. Atwood, M. Burnett, J. Cadiz, and C. Cook. Does continuous visual feedback aid debugging in direct–manipulation programming systems? In ACM Converence on Human Factors in Computing Systems, pp. 22–27, Mar. 19987. (Wilcox97).

W. Wong, R. Horgan, S. London, and A. Mathur. Effect of test set minimization on fault detection effectiveness. In 17th Interantional Conference on Software Engineering, pp. 41–50, Apr. 1995. (Wong95).

S. Yang, M. Burnett, E. DeKoven, and M. Zloof. Representation design benchmarks: A design–time aid for VPL navigable static representation. Journal of Visual Languages and Computing, 8(5/6):563–599, Oct./Dec. 1997. (Yang97).

* cited by examiner

| | NAME | ID | HH1 | HH2 | HH3 | MIDTERM | FINAL | COURSE |
|---|---|---|---|---|---|---|---|---|
| | | | | Student Grades | | | | |
| 1 | Abbott, Mike | 1035 | 89 | 84 | 83 | 91 | 86 | 86 |
| 2 | Farnes, Joan | 7649 | 92 | 95 | 90 | 94 | 92 | 92 |
| 3 | Green, Matt | 2314 | 78 | 83 | 69 | 80 | 75 | 76 |
| 4 | Smith, Scott | 2316 | 84 | 87 | 88 | 90 | 86 | 87 |
| 5 | Thomas, Sue | 9857 | 91 | 82 | 83 | 87 | 90 | 87 |
| AVERAGE | | | 87 | 86 | 83 | 88 | 86 | 86 |

FIG. 1

METHODOLOGY FOR TESTING SPREADSHEETS

RELATED APPLICATION DATA

This application claims priority from U.S. Provisional Application No. 60/125,414, filed Mar. 22, 1999, entitled "METHODOLOGY FOR TESTING SPREADSHEETS" incorporated by reference.

This invention was made with the U.S. Government support under Grant Numbers CCR-9457473, CCR-9703108 and EIA-9806821, awarded by the National Science Foundation (NSF). The U.S. Government has certain rights in the invention.

BACKGROUND OF THE INVENTION

Spreadsheet languages, which are also known as form-based languages in some of the research literature, provide a declarative approach to programming, characterized by a dependence-driven, direct-manipulation working model (Ambler92). Users of spreadsheet languages create cells, and define formulas for those cells. These formulas reference values contained in other cells and use them in calculations. When a cell's formula is defined, the underlying evaluation engine calculates the cell's value and those of other affected cells (at least those that are visible to the user), and displays new results.

Spreadsheet languages include, as a subclass, commercial spreadsheet systems. These systems are widely used by end users, for a variety of computational tasks. The spreadsheet paradigm is also a subject of ongoing research. For example, there is research into using spreadsheet languages for matrix manipulation problems (Vichstaedt92), for providing steerable simulation environments for scientists (Burnett94), for high-quality visualizations of complex data (Chi97), and for specifying full-featured GUIs (Myers91).

Despite the end-user appeal of spreadsheet languages and the perceived simplicity of the paradigm, research shows that spreadsheets often contain faults. For example, in an early spreadsheet study, 44% of "finished" spreadsheets still had errors (Brown87). A more recent survey of other such studies reported errors in 38% to 77% of spreadsheets at a similar stage (Panko96). Of perhaps even greater concern, this survey also includes studies of "production" spreadsheets, those actually in use for day-to-ay decision-making, and these results ranged from 10.7% to 90% having errors. A possible factor in this problem is the unwarranted confidence creators of spreadsheets seem to have in the reliability of those spreadsheets (Wilcox97).

In spite of this evidence, no discussion is found in the research literature of techniques for testing spreadsheets. In fact, there has been only a little work on testing in other paradigms that follow declarative models. In the domain of functional and dataflow programming, there has been work on specification-based testing (e.g., (Kuhn97, Ouabd95)), but creators of spreadsheets rarely employ formal specifications. There has also been some recent research (Azem93, Belli95, Luo92) that considers problems of testing and reliability determination for logic programs written in Prolog. The logic paradigm is like the spreadsheet paradigm in that both are declarative, but several features of the logic paradigm, such as the bidirectional nature of unification and backtracking after failure, are so different from the spreadsheet paradigm that the testing techniques developed for Prolog cannot be applied to the spreadsheet paradigm.

On the other hand, there has been extensive research on testing imperative programs (e.g., (Clarke89, Duesterwald92, Frank193, Frank88, Harrold88, Hutchins94, Laski83, Ntafos84, Offutt96, Perry90, Rapps85, Rothermel97a, Weyuker86, Weyuker93, Wong95)), and it is in this body of work that the methodology presented in this document has its roots. However, significant differences exist between the spreadsheet and imperative programming paradigms, and these differences have important ramifications for testing methodologies. These differences can be divided into three classes.

The first class pertains to evaluation models. Evaluation of spreadsheets is driven by data dependencies that exist between cells, and spreadsheets contain explicit control flow only within cell formulas. Thus, spreadsheets are more appropriately tested using adequacy criteria that are data-dependence-based than criteria that are strictly control-flow-based. The dependence-driven evaluation model also implies that evaluation engines have flexibility in the scheduling algorithms and optimization devices they might employ to perform computations. A methodology for testing spreadsheets must be compatible with such mechanisms, and not rely upon particular evaluation orders or prevent optimizations based on value caching.

The second class of differences pertains to interactivity: spreadsheet systems are characterized by incremental visual feedback that is intertwined with the program construction process. The most widely-seen example of this is the "automatic recalculation" feature. This incremental visual feedback makes desirable use of testing methodologies that support an incremental input and validation process. For example, when a user changes a formula, the testing subsystem should provide feedback about how this affects the "testedness" of each visible portion of the program. This raises the issue of dealing with evolving spreadsheets while maintaining suitable response time.

The third class of differences pertains to users of spreadsheet languages. Imperative languages are most commonly used by professional programmers who are in the business of producing software. These programmers can be expected to know something about testing, and to place a high priority on doing a reasonably good job of testing. On the other hand, spreadsheet systems are used by a variety of users, many of whom are not professional programmers and have no interest in learning about formal testing methodologies. The goal is to provide at least some of the benefits of formal testing methodologies to these users.

Accordingly, a need remains for a suitable methodology for testing spreadsheets.

SUMMARY OF THE INVENTION

To accommodate the evaluation models used with spreadsheets and the interactive process by which they are created, the methodology of the present invention is validation-driven and incremental. This is accomplished through the use of a test adequacy criterion that focuses on dependencies that influence validated output cells, and through the use of incremental program analysis. To accommodate the user base of these languages, an interface to the methodology is provided that does not require an understanding of testing theory. This is accomplished through a fine-grained integration with the spreadsheet environment to provide testing information visually.

One aspect of the invention is a method for testing a spreadsheet cell. Test elements are collected for the spreadsheet cell. In the preferred embodiment, the test elements are du-associations. The cell's execution trace is tracked, and the subset of test elements that participated in the execution trace is marked as executed.

Another aspect of the invention is a method for providing a user with feedback of the testedness of the spreadsheet cells. The set of test elements for each spreadsheet cell is maintained, and the subset of the set of test elements that have been exercised by a test is identified. Using the sizes of the set of test elements and the subset of the set, a testedness measure is calculated for the cell, which is provided to the user.

BRIEF DESCRIPTION OF THE DRAWINGS

FIG. 1 shows an example spreadsheet on a computer display.

DETAILED DESCRIPTION OF THE PREFERRED EMBODIMENT

I. Background and Definitions

A. Spreadsheet Languages

Figure 2A:
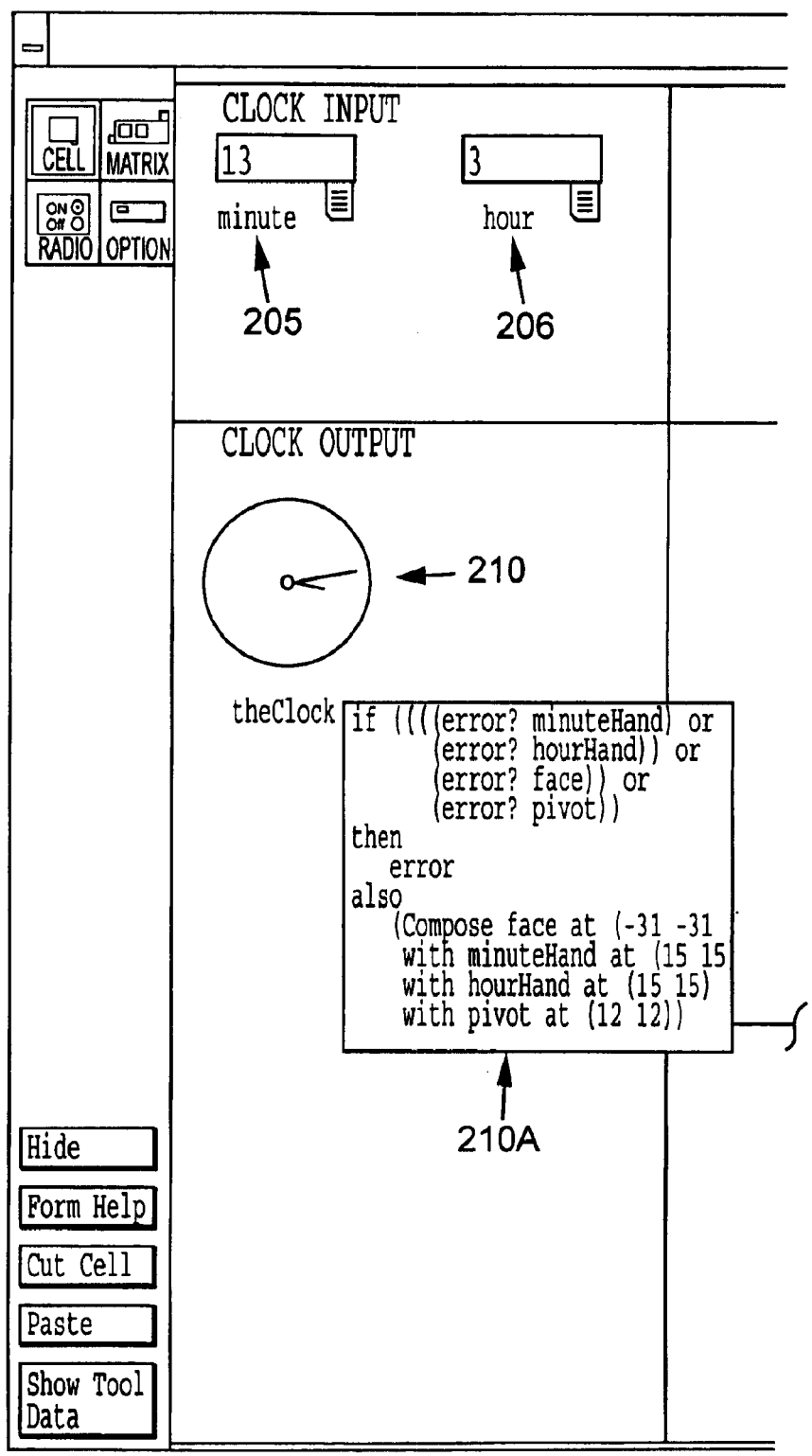
FIGS. 2A–2B show a second example spreadsheet with formulae embedded in some of the spreadsheet cells.

Users of spreadsheet languages set up spreadsheets and specify their contents in order to program. The contents of a spreadsheet are a collection of cells; each cell's value is defined by that cell's formula; and as soon as the user enters a formula, it is evaluated and the result is displayed. The best-known examples of spreadsheet languages are found in commercial spreadsheet systems, but there are also many research systems (e.g., (Burnett98b, Chi97, Leopold97, Myers91, Smedley96, Viehstaedt92)) based on this paradigm.

Below are described examples of spreadsheets in the research language Forms/3 (Burnett98b). FIG. 1 shows a traditional-style spreadsheet used to calculate student grades in Forms/3. A typical spreadsheet 100 is composed of a number of rows 105 and a number of columns 110. Each cell 115 lies at the intersection of a row and a column. As shown with cell 120, a cell can span multiple columns; not shown, but equally possible, are cells that span multiple rows or span both rows and columns. Each cell 115 can contain different data: for example, cell 125 stores the name "Farnes, Joan" and cell 130 stores the name "Green, Matt." The spreadsheet lists several students, and several assignments performed by those students. The last row in the spreadsheet calculates average scores for each assignment, the rightmost column calculates weighted averages for each student, and the lower-right cell gives the overall course average (formulas not shown).

Figure 2B:
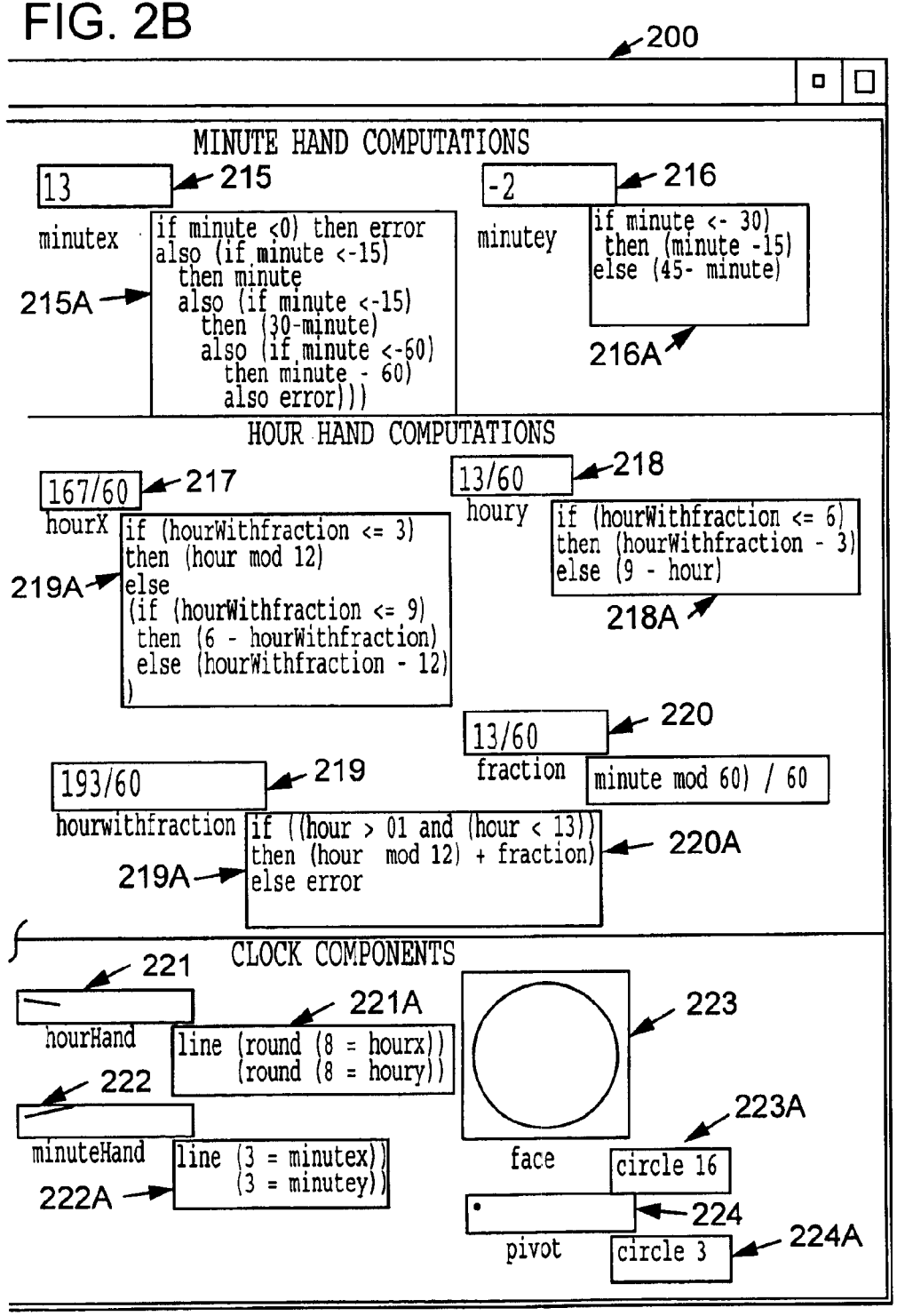
Figure 3:
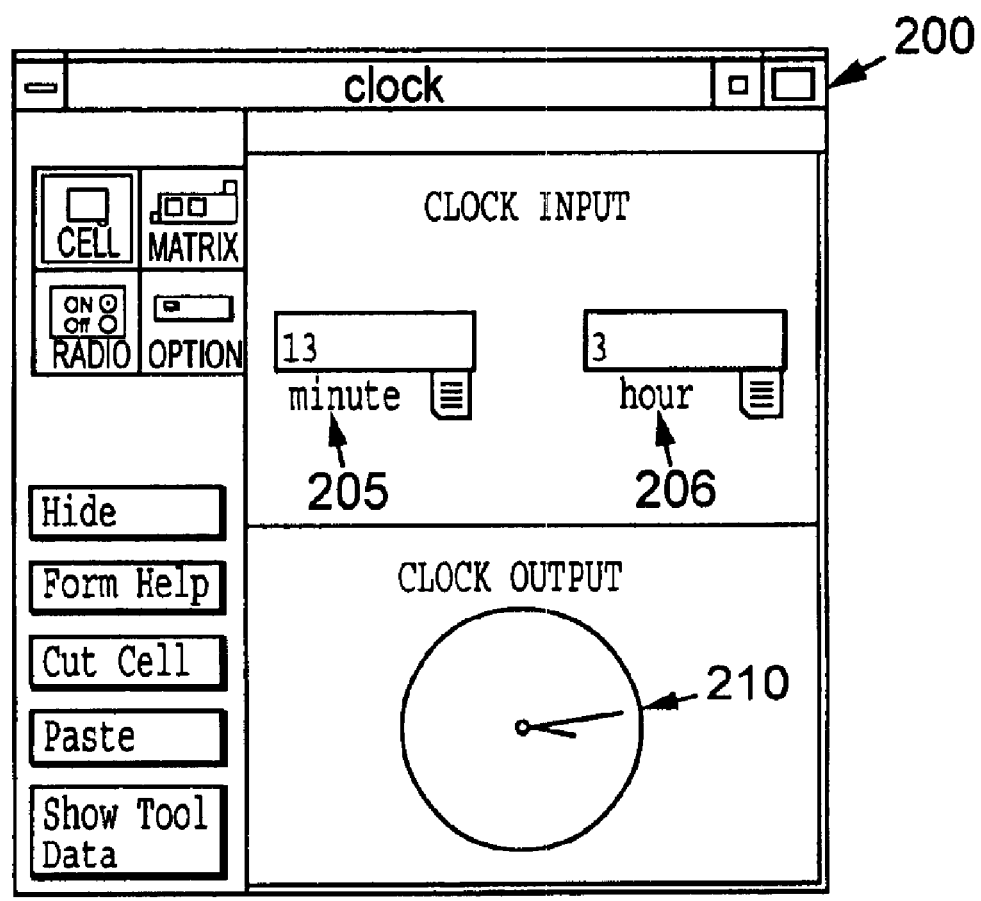
FIG. 3 shows the example spreadsheet of FIGS. 2A–2B with the formulae and several cells hidden.

FIGS. 2A–2B and 3 show how a user could construct a graphical clock in Forms/3. Consider clock 200's thirteen cells shown in FIGS. 2A–2B with their formulas, including two input cells (upper left) (cells 205 and 206 in FIG. 2A) that could eventually be replaced with references to the system clock, one output cell (middle left) (cell 210 and formula 210a), and several cells used in intermediate calculations (right) (cells 215–224 and formulae 251a–224a in FIG. 2B). The term input cell refers to cells whose formulas contain only constants. The term output cell refers to cells not referenced in any formula. After the programming is finished, the cells that calculate intermediate results can be hidden, and other cells rearranged, to reach the user view shown in FIG. 3.

This description considers a "pure" spreadsheet language model, which includes ordinary spreadsheet-like formulas such as those described by the grammar in Table 1, but need not include advanced programmer-oriented features such as macros, imperative sublanguages, and recursion. Table 1 reflects a subset of Forms/3, a language following this model. The subset shown uses ordinary spreadsheet formulas for both numeric and graphical computations; the figures presented in this specification were programmed using this subset. From this grammar, it is clear that the only dependencies between one cell and another are data dependencies. Because of this fact, cells can be scheduled for evaluation in any order that preserves these dependencies.

TABLE 1 formula ::= BLANK | expr
expr ::= CONSTANT | CELLREF | ERROR | infixExpr |
    prefixExpr | ifExpr | composeExpr
infixExpr ::= subExpr infixOperator subExpr
prefixExpr ::= unaryPrefixOperator subExpr |
    binaryPrefixOperator subExpr subExpr
ifExpr ::= IF subExpr THEN subExpr ELSE subExpr |
    IF subExpr THEN subExpr
composeExpr ::= COMPOSE subExpr withclause
subExpr ::= CONSTANT | CELLREF | (expr)
infixOperator ::= + | − | * | / | AND | OR | = | . . .
unaryPrefixOperator ::= NOT | ERROR? | CIRCLE | . . .
binaryPrefixOperator ::= LINE | BOX | . . .
withclause ::= WITH subExpr AT (subExpr subExpr) |
    WITH subExpr AT (subExpr subExpr)

B. Evaluation Strategies for Spreadsheet Languages

The evaluation strategies used in spreadsheet languages, unlike those used in imperative languages, have a great deal of latitude regarding execution sequence, provided that all dependencies are preserved. Thus, evaluation in spreadsheets processes cells in the dataflow paths between input cells and output cells following the principles of either eager evaluation or lazy evaluation, with a variety of optimizations and variations possible. Eager evaluation is driven by changes: whenever a value of cell X is changed, the change is propagated to every cell that is affected by the change. For example, if a user edits cell X's formula, then if cell Y references cell X in its formula then cell Y is also recomputed, which in turn causes cells that refer to cell Y to be recomputed, and so on. Determining which cells are affected is usually done conservatively, i.e., from a static perspective.

In contrast to this strategy, lazy evaluation is driven by output: the first time a cell X is displayed, it is computed, and so is every cell that cell X needs. For example, if cell X is moved onto the screen through window manipulations, every cell that it needs is computed (and every cell that they need, and so on) in order to finally calculate cell X. Whether cell X "needs" cell Y is usually determined dynamically. For example, if cell X's formula is "TRUE or Y", then the reference to cell Y will not be needed if the evaluation engine evaluates the first operand before the second. It has been shown that lazy evaluation produces the same answers as eager evaluation, provided that both terminate. However, lazy evaluation computes fewer cells.

Because spreadsheet languages are visual, keeping many cells on display automatically, usually at least some of the cell values are cached. This means that an evaluation engine also needs to keep track of which cached values are up-to-date if the user has started changing formulas. There are several methods for doing so (which are surveyed in (Burnett98a)), but their mechanism is not relevant to the issues in this document.

In spreadsheet languages, some cells will be on the screen and some will not. There are both static and dynamic mechanisms for determining which are on the screen. For example, in some languages it is possible to statically "hide" cells. In most spreadsheet languages, the user can also scroll or otherwise move cells on and off the screen at runtime through direct manipulation. Which cells are on-screen can influence the user's testing behavior, because they determine which input cells a user can notice and attend to, and which output cells the user can see. In the case of languages following lazy evaluation, which cells are on-screen also determines which cells will be computed, since lazy evaluation is output-driven.

C. An Abstract Model for Spreadsheets

Figure 4A:
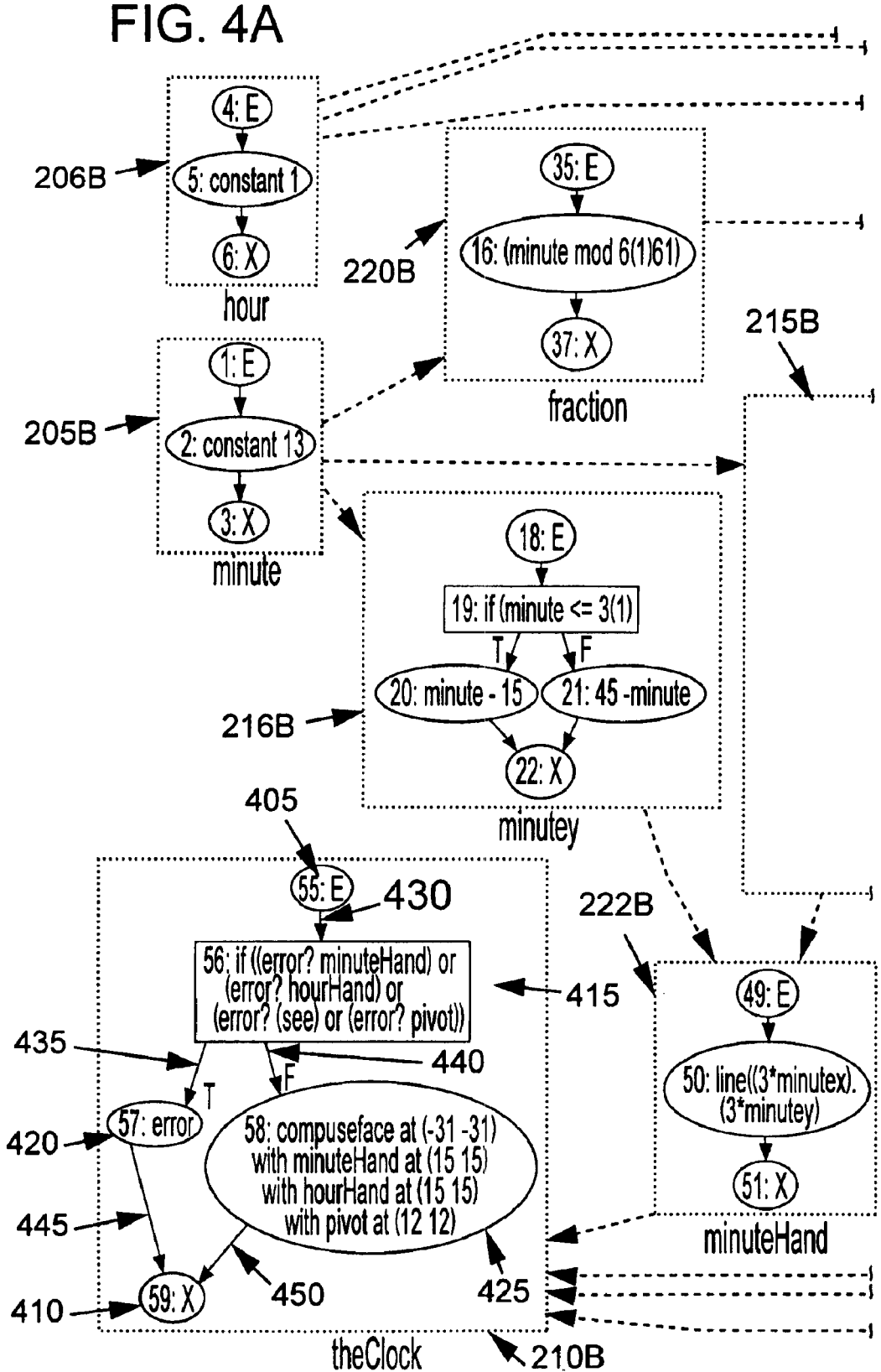
FIGS. 4A–4B show a cell relation graph for the spreadsheet of FIGS. 2A–2B.
Figure 4B:
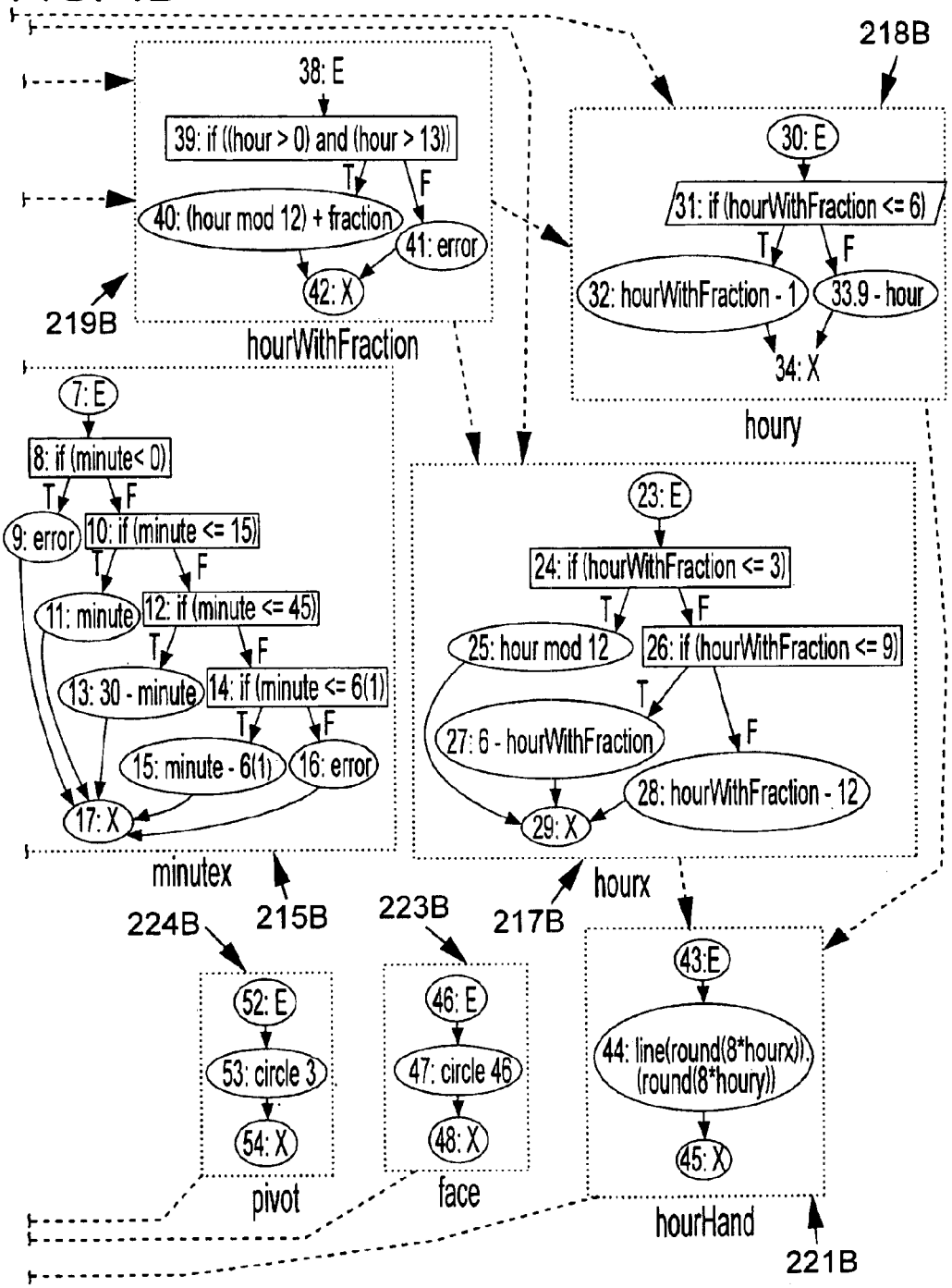

Test adequacy criteria provide help in selecting test data and in deciding whether a program has been tested "enough." Test adequacy criteria have been well researched for imperative languages (e.g., (Clarke89, Frankl88, Ntafos84, Perry90)), where they are often defined on abstract models of programs rather than on code itself. An abstract model for spreadsheet languages is created, called a cell relation graph (CRG). A CRG is a pair (V, E), where V is a set of formula graphs, and E is a set of directed edges connecting pairs of elements in set V. FIGS. 4A–4B depict the CRG for Clock 200. FIGS. 4A–4B show the interrelation of each formula graph 205b, 206b, 210b, and 215b–224b: which formula graphs depend on which other formula graphs.

Each formula graph in set V models flow of control within a cell's formula, and is comparable to a control flow graph representing a procedure in an imperative program (Aho86, Rapps85). There is one formula graph for each cell in the spreadsheet. The process of translating an abstract syntax tree representation of an expression into its control flow graph representation is well known (Aho86); a similar translation applied to the abstract syntax tree for each formula in a spreadsheet yields that formula's formula graph. For example, FIGS. 4A–4B show the formula graphs for each of the cells in Clock 200, delimited by dotted rectangles. In the formula graphs, nodes labeled "E" and "X" are entry and exit nodes, respectively, and represent initiation and termination of the evaluation of formulas. Nodes with multiple out-edges (represented as rectangles) are predicate nodes. Other nodes are computation nodes. Edges within formula graphs represent flow of control between expressions, and edge labels indicate the value to which conditional expressions must evaluate for particular paths to be taken. For example, formula graph 210b for theClock includes entry node 405 (numbered 55), exit node 410 (numbered 59), and nodes 415, 420, and 425 (numbered 56, 57, and 58, respectively). Formula graph 210b also includes edges 430, 435, 440, 445, and 450.

One form of expression supported by spreadsheets that can be seen in the grammar of Table 1 merits special attention. In spreadsheet languages, because there are only expressions and hence no statements, the if construct instantiates an expression instead of a statement, which allows "conditional subexpressions", i.e., if expressions included as subexpressions in other expressions. For example, a cell C's formula can consist of the expression x+(if y=0 then 1 else 2). But what is the proper formula graph for such an expression? The approach of (Aho86) parses this expression into a pair of intermediate code statements (instead of expressions): (i) if y=0 then tmp=1 else tmp=2 and (ii) C=x+tmp. A formula graph for this pair of statements consists of the nodes required to represent statement (i), followed by the node required to represent statement (ii), and these nodes include constructs not legal in formulas to represent assignment, variables, and statements. A disadvantage of this approach, especially to an audience of end users, is that if reasoning about the testedness of a cell or relationship is based in part upon constructs not allowed in spreadsheet formulas, feedback about the testedness of a particular cell or relationship might not be understandable to the user.

A second approach to modeling this expression is to use a "virtual cell" tmp to represent the computation of if y=0 then 1 else 2 and treat C's formula as consisting only of x+tmp. However, since this approach introduces a cell not actually present in the spreadsheet, feedback based on reasoning about tmp may still not be understandable to the user.

A third approach is to distribute operand x over the if expression, obtaining if y=0 then x+1 else x+2 (in the formula graph, not in the user view), and model this like any other if expression. The third approach was selected for the present invention, as it is the most likely to be understandable by end users. Note also that, although conditional subexpressions are not expected to be used widely by spreadsheet users, they are supported by popular spreadsheet languages, and hence need to be supported by the spreadsheet testing methodology.

The set E of edges in the CRG, cell dependence edges, models dependencies between cells. FIGS. 4A–4B depict these edges by dashed lines. Each edge encodes the fact that the destination cell refers to the input cell in its formula; thus, the arrows show direction of dataflow. Note that cell dependence information is typically available to evaluation engines within spreadsheet systems as a consequence of the need to evaluate formulas; thus, this information need not be specially calculated for use in CRGs.

A way to associate dynamic execution of formulas with CRG components is also required. Let F be a formula with formula graph $\overline{F}$, and let $F_e$ and $F_x$ be the entry and exit nodes, respectively, of $\overline{F}$. An evaluation of F traverses a path through $\overline{F}$ beginning at $F_e$ and ending at $F_x$. This path is called the execution trace for that evaluation.

D. Test Adequacy Criteria for Spreadsheets

This abstract model is used to define several test adequacy criteria for use with spreadsheets.

First, criteria analogous to the statement and branch coverage criteria used in the testing of imperative programs are defined. Let F be a formula with formula graph $\overline{F}$. Test t exercises a node n in $\overline{F}$ if F's execution trace, given t, includes n. A test suite T is node-adequate for spreadsheet S if, for each formula graph $\overline{F}$ in the CRG for S, for each dynamically executable node n in $\overline{F}$, there is at least one test in T that exercises n. Similarly, test t exercises an edge ($n_1$, $n_2$) in $\overline{F}$ if F's execution trace, given t, includes ($n_1$, $n_2$). A test suite T is edge-adequate for spreadsheet S if, for each formula graph $\overline{F}$ in the CRG for S, for each dynamically executable edge ($n_1$, $n_2$) in $\overline{F}$, there is at least one test in T that exercises ($n_1$, $n_2$).

Node and edge adequacy criteria, however, do not explicitly consider interactions between cell formulas, and these interactions are a common input of errors in spreadsheets (Brown87). An alternative criterion, cell-dependence adequacy, focuses on such interactions. Let A and B be cells in spreadsheet S, with formula graphs $\overline{A}$ and $\overline{B}$, respectively, and let B be cell dependent on A, represented as edge ($\overline{A},\overline{B}$) in the CRG for S. Test t exercises cell dependence edge ($\overline{A}$, $\overline{B}$) if B's execution trace, given t, contains a node associated with an expression that references A. A test suite T is cell-dependence-adequate for spreadsheet S if, for each cell dependence edge (x, y) in the CRG for S, there is at least one test in T that exercises (x, y).

The cell dependence adequacy criterion requires coverage of some dependencies between cells. However, it does not require coverage of all such dependencies, and it does not explicitly consider the effects of the subexpression-level control dependencies that are created by predicate expressions. (Rothermel97b) explored analogues of the dataflow test adequacy criteria that have been defined for imperative programs (Frank188, Laski83, Ntafos84, Rapps85). (Rothermel97b) showed that a criterion based on the all-uses dataflow adequacy criterion (Frank188, Rapps85), which relates test adequacy to interactions between occurrences of variables in the input code, can be particularly appropriate for spreadsheets because it exercises both interactions between cells and expressions within cell formulas.

The remainder of this description focuses on the use of this criterion, called the du-adequacy criterion, as the preferred test element. The criterion is described and defined, and then the testing methodology is illustrated based on the criterion. That methodology can easily be adapted to support the use of the other criteria described above as test elements.

E. DU-Adequacy for Spreadsheets

In spreadsheets, cells serve as variables, and the value for cell C can be defined only by expressions in C's formula. Let C be a cell in spreadsheet S, with formula F and formula graph $\overline{F}$. If C is an input cell, then $\overline{F}$ contains only one node other than entry and exit nodes, and that node is a definition of C. If C is not an input cell, then each computation node in $\overline{F}$ that represents an expression referring to cell D is a c-use (computation use) of D and a definition of C. Each edge in $\overline{F}$ that has as its input a predicate node n such that n represents a conditional expression referring to another cell D is a p-use (predicate use) of D.

A definition-use association (du-association) links definitions of cells with uses that those definitions can reach. Two types of associations are of interest. A definition-c-use association is a triple ($n_1$, $n_2$, C), where $n_1$ is a definition of cell C, $n_2$ is a c-use of C, and there exists an assignment of values to S's input cells, in which $n_1$ reaches $n_2$. A definition-p-use association is a triple ($n_1$, ($n_2$, $n_3$), C), where $n_1$ is a definition of cell C, ($n_2$, $n_3$) is a p-use of C, and there exists an assignment of values to S's input cells, in which $n_1$ reaches $n_2$, and causes the predicate associated with $n_2$ to be evaluated such that $n_3$ is the next node reached.

A test adequacy criterion is applicable if, for every program P, there exists a finite test set that is adequate according to that criterion for P (Weyuker86). To ensure the applicability of adequacy criteria based on these definitions, the definitions specify only executable du-associations: du-associations for which there exists some assignment of input values to S that causes the definition to reach the use. Determining whether a du-association is executable is, however, a difficult problem (Frank188, Weyuker93); thus, algorithms for calculating the du-associations that exist in a program approximate them by collecting static du-associations: du-associations that can be determined by static inspection of the code.

Given du-association ($n_1$, $n_2$, C) (or ($n_1$, ($n_2$, $n_3$), C)), where $n_2$ (or ($n_2$, $n_3$)) is in $\overline{F}$, a test t is said to exercise that du-association if the execution trace of $\overline{F}$, given $\underline{t}$, contains $n_2$ (or ($n_2$, $n_3$)), such that $n_1$ is the definition of cell C's execution time given $\underline{t}$.

A notion of a du-adequate test set in terms of its inclusion of tests that exercise all du-associations could be defined. However, under such a definition, a test suite could be adequate even though no attempt had been made to validate test outputs. Thus, instead, following the notion of the "output-influencing all-du-pairs" criterion introduced in (Duesterwald92), a test adequacy criterion defined in terms of du-associations that affect cell outputs is preferred. A test suite T is du-adequate for spreadsheet S if and only if, for each du-association du-a in S, there is at least one test that exercises du-a in such a way that du-a influences, directly or transitively, a cell output.

Du-adequacy potentially integrates nicely into the spreadsheet paradigm, for several reasons. To satisfy the du-adequacy criterion, test suites must exercise interactions between cells that are not necessarily exercised by node-, edge-, or cell-dependence-adequate test suites. An additional advantage of this criterion involves its (relative) ease of application to spreadsheets. Dataflow analysis and dataflow testing of imperative programs are complicated by the presence of dynamically-determined addressing and aliases. Spreadsheets might utilize arrays and matrices and refer to them in formulas; however, for most spreadsheet languages, such references can be resolved statically. Spreadsheets can have aliases to the extent that multiple names refer to a single cell; however, for most spreadsheet languages these aliases, too, can be resolved statically. Finally, as shown below, the absence in spreadsheets of loops and of definitions that "kill" other definitions simplifies algorithms for calculating du-associations.

F. A System for Testing

Figure 12:
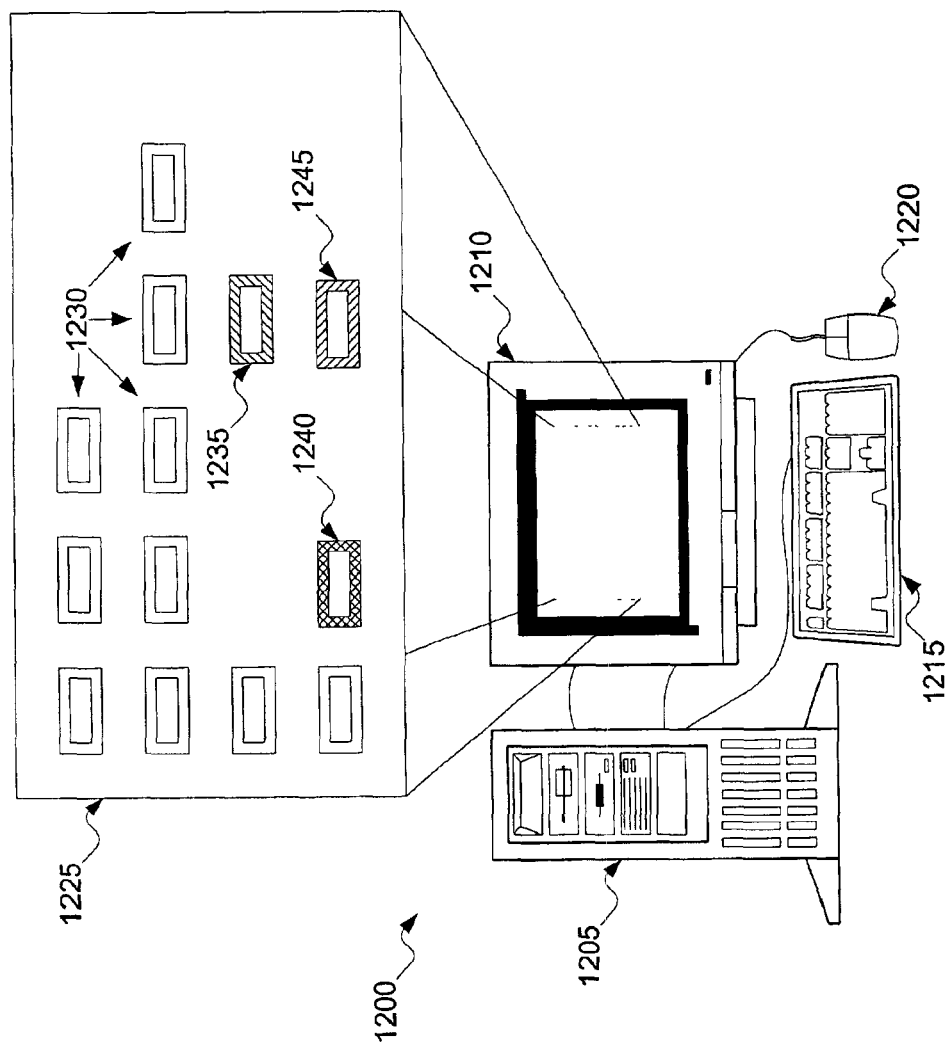
FIG. 12 shows a computer system for testing a spreadsheet according to the preferred embodiment of the invention.

FIG. 12 shows a typical computer system 1200 that can be used for testing spreadsheet cells using the preferred embodiment. Computer system 1200 includes a computer 1205 (including, among other components, a CPU and memory (not shown)), a monitor 1210, a keyboard 1215, and a pointer on mouse 1220. Optional equipment not shown can include a printer, plotter, light pen, and so forth. Computer system 1200 can also be connected to a network. Displayed on monitor 1210 is a spreadsheet 1225. Spreadsheet 1225 includes several cells 1230, 1235, and 1240. Cells 1235 and 1240 in particular show cells in various stages of testedness. In the preferred embodiment monitor 1210 displays cells 1235 and 1240 using colors; however, grayscale and fill patterns can also be used to indicate measures of testedness, and will be used in this application for simplicity.

II. A Methodology for Testing Spreadsheets

Three classes of differences between the spreadsheet language paradigm and traditional imperative paradigms were discussed earlier. To accommodate these differences, a testing methodology based on the use of the du-adequacy criterion that is validation-driven and incremental, and is integrated at a fine granularity into the spreadsheet environment, is developed, providing the following functionalities:

The ability to determine incrementally the static du-associations in an evolving spreadsheet whenever a new cell formula is entered.

The ability to track automatically the execution traces, which provide the information necessary to determine the dynamic du-associations that currently influence calculations.

A user-accessible facility for pronouncing outputs "validated" at any point during spreadsheet development, and the abilities both to determine the du-associations that should be considered exercised as a result of this validation and to communicate immediately to the user how well exercised the visible section of the spreadsheet is.

The ability to determine the du-associations affected by a spreadsheet change, and immediately depict their altered validation status in the visible section of the spreadsheet.

The ability to recalculate du-associations and validation information when an entire pre-existing spreadsheet is loaded, or when a large portion of a spreadsheet is modified by a single user action.

How this methodology provides these functionalities to spreadsheet languages is next described in the context and sequence of a series of tasks in an integrated spreadsheet development and testing session.

Task 1: Collecting Static Du-Associations

Figure 5:
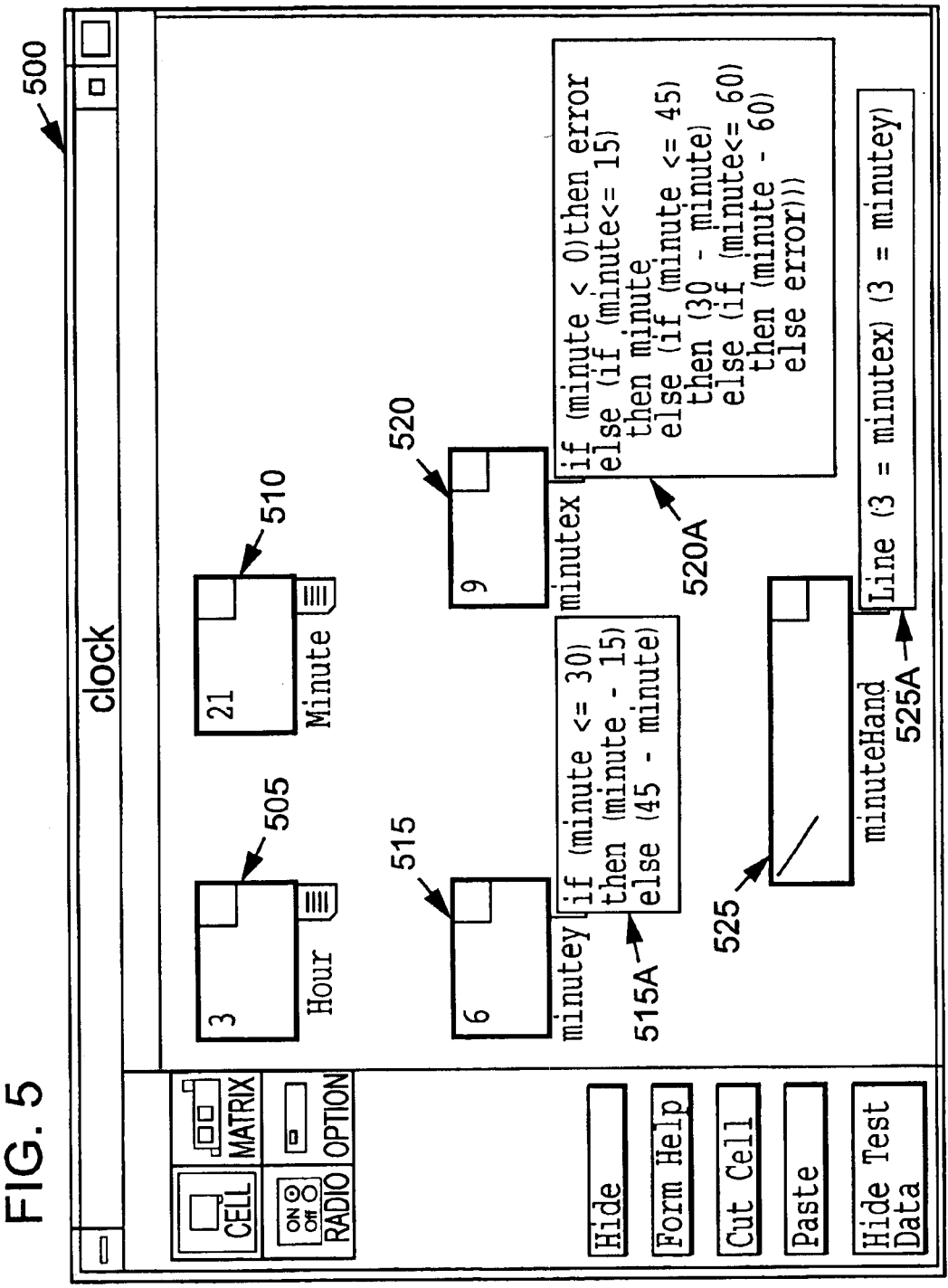
FIG. 5 shows the example spreadsheet of FIGS. 2A–2B in a state of partial construction.

Suppose that, starting with an empty spreadsheet, the user begins to build the Clock application discussed earlier by entering cells and formulas, reaching the state shown in FIG. 5. In FIG. 5, spreadsheet 500 has cells 505, 510, 515, 520, and 525. Cells 515, 520, and 525 have formulae 515*a*, 520*a*, and 525*a*. Assume for the moment that the user does not change any formulas, but simply continues to add new ones. (This restriction is removed later.)

Because it would be expensive to exhaustively compute the du-associations for the entire spreadsheet after each new formula is added, these associations preferably are computed incrementally. Several algorithms for incremental computation of data dependencies exist for imperative programs (e.g., (Marlowe90, Pollock89)), and one of these algorithms could be adapted to this purpose. However, there are two attributes of spreadsheet systems that allow a more efficient approach.

First, in spreadsheet languages, the syntax of cell formulas ensures that all definitions of a cell C appear in C's own formula, and none of these definitions may be "killed" by any other definition. Second, in spreadsheet systems, the evaluation engine must be called following each formula edit to keep the display up-to-date, visiting at least all cells that directly reference the new cell (termed the direct consumers of the new cell) and all visible cells that are directly referenced by (are the direct producers of) the new cell. At this time, the engine can record local definition-use information for the new cell, that is, the definitions and uses that are explicit in the cell's formula. Together, these two attributes mean that (static) du-associations can be incrementally collected following the addition of a cell C by associating all definitions in C with all uses of C in direct consumers of C, and associating all definitions in direct producers of C with all uses of those cells in C. (See [Marlowe90] for a different view of incremental computation of du-associations as applied within the imperative language paradigm.)

Figure 13:
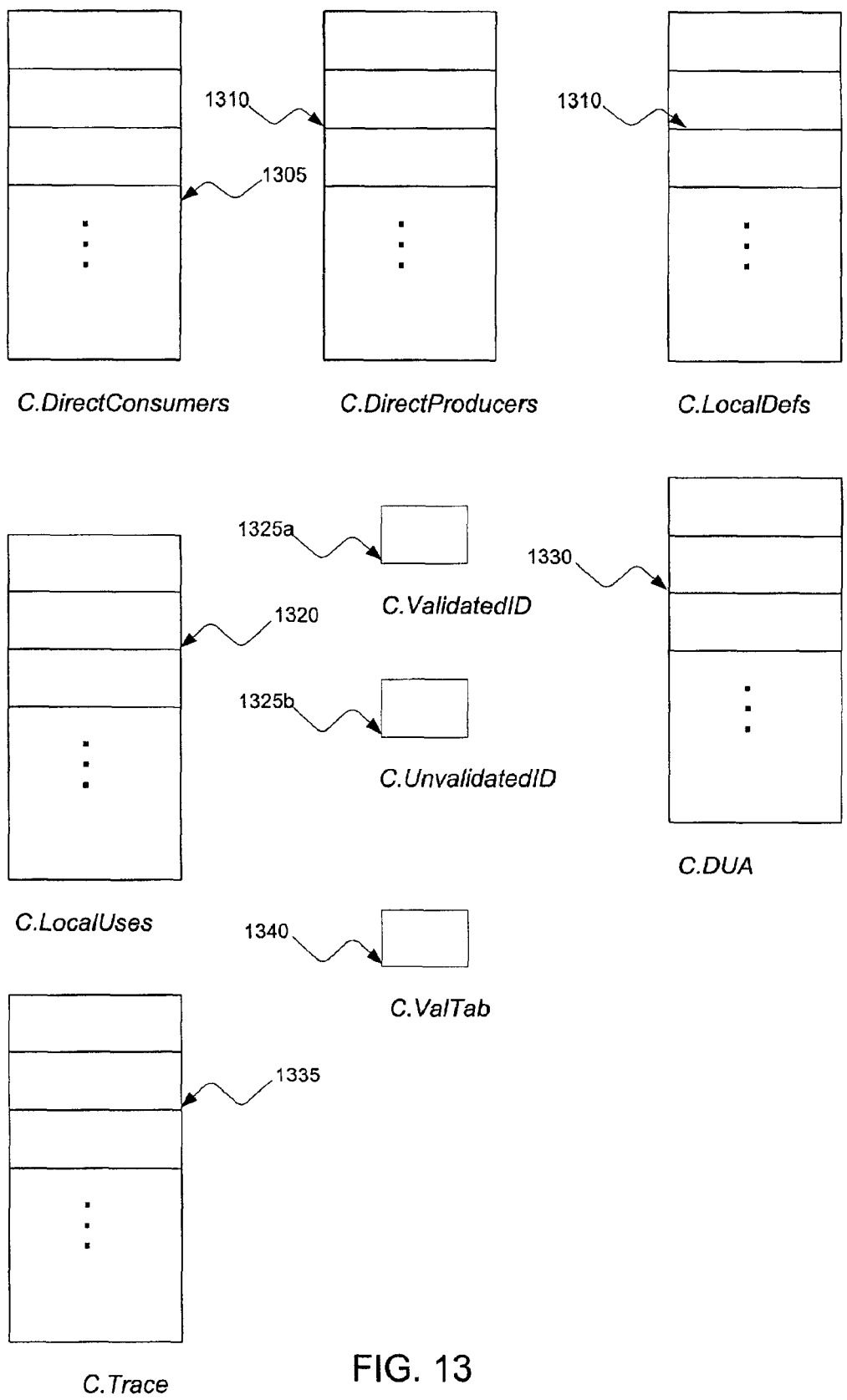
FIG. 13 shows abstractions of the data structures used to store du-associations for a spreadsheet according to the invention.

A hash table can efficiently store the following data for each cell C (abstractions of these data structures are shown in FIG. 13): C.DirectConsumers 1305, the cells that reference C; C.DirectProducers 1310, the cells that C references; C.LocalDefs 1315, the local definitions in C's formula; C.LocalUses 1320, the local uses in C's formula; C. ValidatedID 1325*a* and C.UnValidatedID 1325*b*, integer flags whose use is described later; C.DUA 1330, a set of pairs (du-association, exercised) for each static du-association (d, u) such that u is in C.LocalUses, and exercised is a Boolean that indicates whether that association has been exercised; C. Trace 1335, which records dynamic trace information for C; and C.ValTab 1340, which records validation status. It is reasonable to rely upon the formula parser and the evaluation engine to provide the first four of these items, because they are already needed to efficiently update the display and cached value statuses after each edit. The remaining items can be calculated by the testing subsystem.

Figure 6:
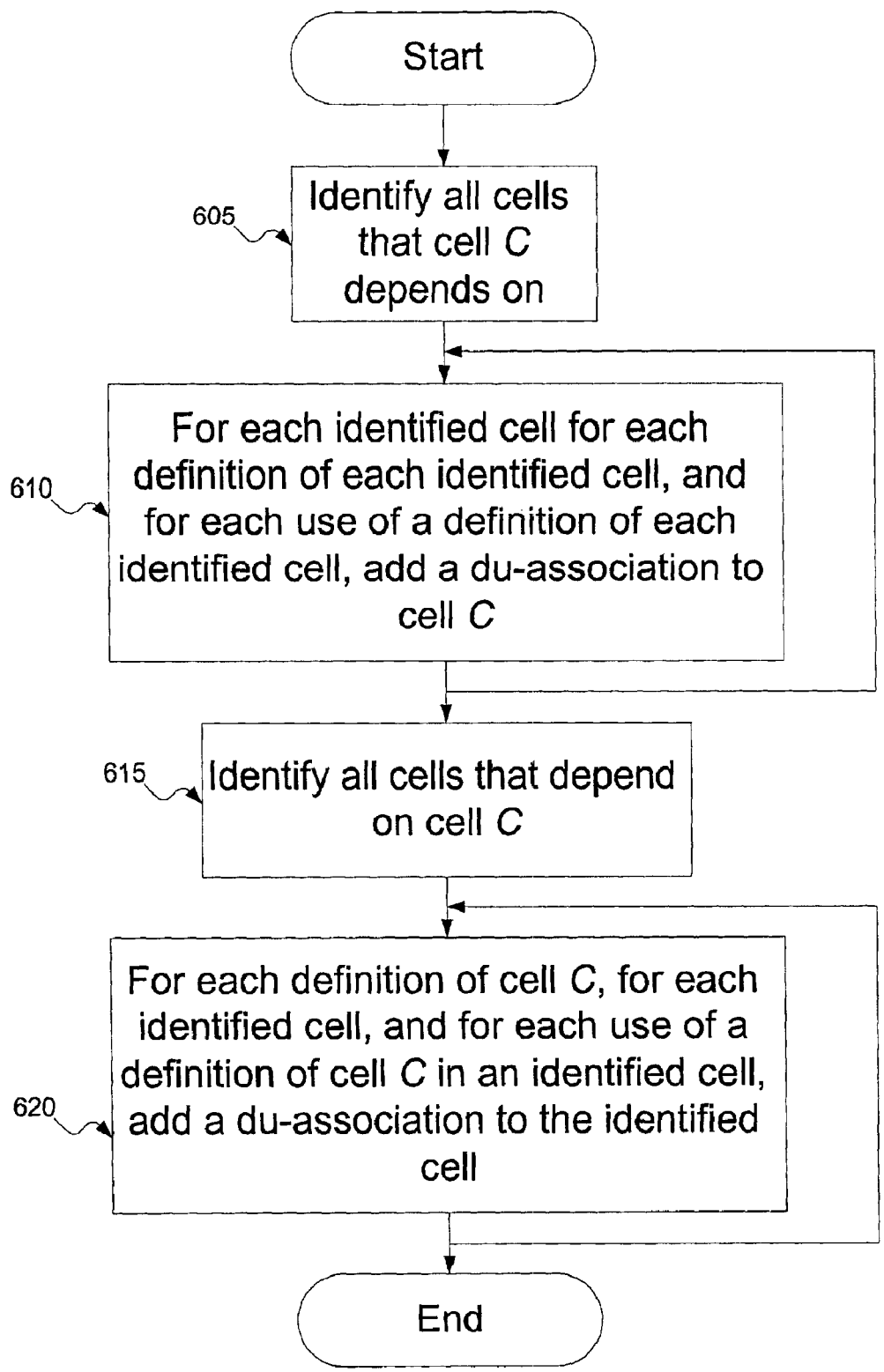
FIG. 6 shows a flowchart for the algorithm for collecting du-associations affected by a cell according to the invention.

Algorithm CollectAssoc of Table 2 is triggered when a new formula is added, to collect new static du-associations. FIG. 6 shows a flowchart of algorithm CollectAssoc. Lines 2–5 (steps 605 and 610) collect du-associations involving uses in C. Lines 6–9 (steps 615 and 620) collect du-associations involving definitions (of C) in C. For example, referring back to FIG. 5, suppose that the most recent formula entered is that for cell minuteY 515. Note that its value is displayed, even though the spreadsheet has not been completely entered; when the evaluation engine is triggered to display this value, it collects C.DirectConsumers, C.DirectProducers, C.LocalDefs, and C.LocalUses for minuteY 515 (as done previously for the other cells on display when their formulas were entered). Called with cell minuteY 515, CollectAssoc employs this information to collect six new du-associations, described using the node numbers of FIGS. 4A–4B as: (2, (19, 20), minute), (2, (19, 21), minute), (2, 20, minute), (2, 21, minute), (20, 50, minuteY), and (21, 50, minuteY).

TABLE 2

1. algorithm CollectAssoc(C)
2.   for each cell D ∈ C.DirectProducers do
3.     for each definition d (of D) ∈ D.LocalDefs do
4.       for each use u of D ∈ C.LocalUses do
5.         C.DUA = C.DUA ∪ {((d, u), false)}
6.   for each cell D ∈ C.DirectConsumers do
7.     for each use u of C ∈ D.LocalUses do
8.       for each definition d (of C) ∈ C.LocalDefs do
9.         D.DUA = D.DUA ∪ {((d, u), false)}

CollectAssoc runs in time O(ud(DirectProducers+ DirectConsumers)), where DirectProducers and DirectConsumers are the number of direct producers and direct consumers respectively of C, and u and d are the maximum number of uses and definitions, respectively, in those cells.

In practice, u and d are typically small, bounded by the number of references in a single formula—usually less than 10. In this case, the algorithm's time complexity is O(DirectProducers+DirectConsumers).

This is no more than the order required by most evaluation engines' cell traversal needed to maintain a correct display and process cached values when a new formula is added—the event that triggers CollectAssoc. To see why this is true, consider the possible evaluation engine strategies. As discussed earlier, the two overall strategies possible are eager evaluation, in which the new formula's result is "pushed" to the cell's consumers, and lazy evaluation, in which visible cells "pull" results from their producers when needed for output. Hence, eager evaluation must read the direct producers in order to compute the result of the new formula, and must access the consumers (both direct and transitive) in order to push the new result along (which also ensures that the value cache is up-to-date). Lazy evaluation also must read the direct producers in order to compute the new result and display it, because a cell must be on the screen to be edited. However, there are several possibilities for how to manage the cache information, and this determines whether the direct consumers will be accessed. The most widely used value caching mechanism with lazy evaluation is lazy evaluation with eager marking (LazyEM), in which consumers of a newly-computed result are eagerly marked out-of-date (but not actually recomputed until needed, because evaluation itself is lazy). LazyEM thus, like eager evaluation, accesses all consumers (both direct and transitive). The LazyEM algorithm is formally presented and analyzed in (Hudson91), in which it is shown to be optimal in the number of computations performed, although not optimal in overhead.

Although these are the two evaluation approaches widely used for languages in this class, and both require at least O(DirectProducers+DirectConsumers) time, other approaches are possible that instead access consumers visible on the screen (both direct and transitive), which can be more or fewer than the total number of visible and non-visible direct consumers. Sec (Burnett98a) for a description and performance comparison of eager evaluation and LazyEM, as well as several other variations on lazy evaluation, in the context of a class of visual languages that includes spreadsheet languages. The presence of these possibilities shows that O(DirectProducers+DirectConsumers) is not a lower bound for spreadsheet evaluation and cache maintenance. However, reports only of eager evaluation and LazyEM being actually used to respond to the trigger of a new formula entry have been found, and O(DirectProducers+DirectConsumers) is less than their time costs. This allows the cost of collecting the static du-associations to be potentially masked by the cost of evaluation activity, at least under these two widely-used evaluation approaches.

Task 2: Tracking Execution Traces

To track execution traces, which in Task 3 will enable the incremental computation of du-associations that have been exercised, it is sufficient to insert a probe into the evaluation engine. When cell C executes, this probe records the execution trace on C's formula graph, storing it in C.Trace, adding only O(1) to the cost of execution. For example, in the case of Clock, at the moment depicted in FIG. 5, the execution trace stored for cell minuteY 515, described in terms of the node numbers of FIGS. 4A–4B, is (18, 19, 20, 22). If the cell is subsequently reevaluated, the old execution trace is replaced with the new one. Storing only the most recent execution trace in C.Trace is sufficient for coverage computation because the cumulative coverage in C.DUA is updated incrementally during validation, as described in the discussion of Task 3.

This approach functions for all varieties of evaluation engines: whether the engine eagerly or lazily evaluates cells, following any new formula entry and any dependence-preserving evaluation sequence, all cells have associated with them their most recent execution trace. The correctness of this approach for any evaluation engine rests upon two attributes of this strategy. First, each cell's execution trace is a set rather than a list, rendering any difference in order of execution irrelevant. Second, the granularity of the nodes in the formula graph (and hence in the execution trace) is coarser than the level at which subtle differences among evaluation approaches occur.

To illustrate the second attribute, consider execution of C. C's entry point and exit point (both of which are unique) are by definition always executed. If C's interior (non-entry/exit) nodes do not contain any conditionals ("if" expressions) then there is only one interior node, which contains the entire expression and which, because it is executed at least in part, is recorded in the trace. On the other hand, if there are conditionals, the strategy is the same, eager or lazy—execute the condition node and either the "then" or the "else" node but not both. (Although it may seem that eager evaluation would execute both the "then" and the "else", this could lead to run-time errors, and hence even eager approaches employ "short circuit" evaluation to execute conditionals. An example of a formula that must be executed lazily to avoid such run-time errors is "if A1=0 then 0 else 10/A1".)

Note that, due to the fact that the execution traces are stored for each cell, an evaluation engine's particular caching optimizations do not change the execution traces. If cell D is executed because cell C's execution requires it, there are only two possibilities: either D has a cached value or it does not. If D has a cached value, then D's stored execution trace is still up-to-date. If D does not have a cached value, then D will be executed and its execution trace stored. In neither case does the execution of D affect the execution trace of C. Hence, whether D was executed now or at some previous time does not change the trace stored for C or the trace stored for D.

Task 3: Pronouncing Outputs "Validated"

How the data collected in Tasks 1 and 2 can be used to provide test adequacy information to the user in a way requires no understanding of formal notions of testing. Visual devices are used to draw attention to untested sections of the evolving spreadsheet.

Figure 7:
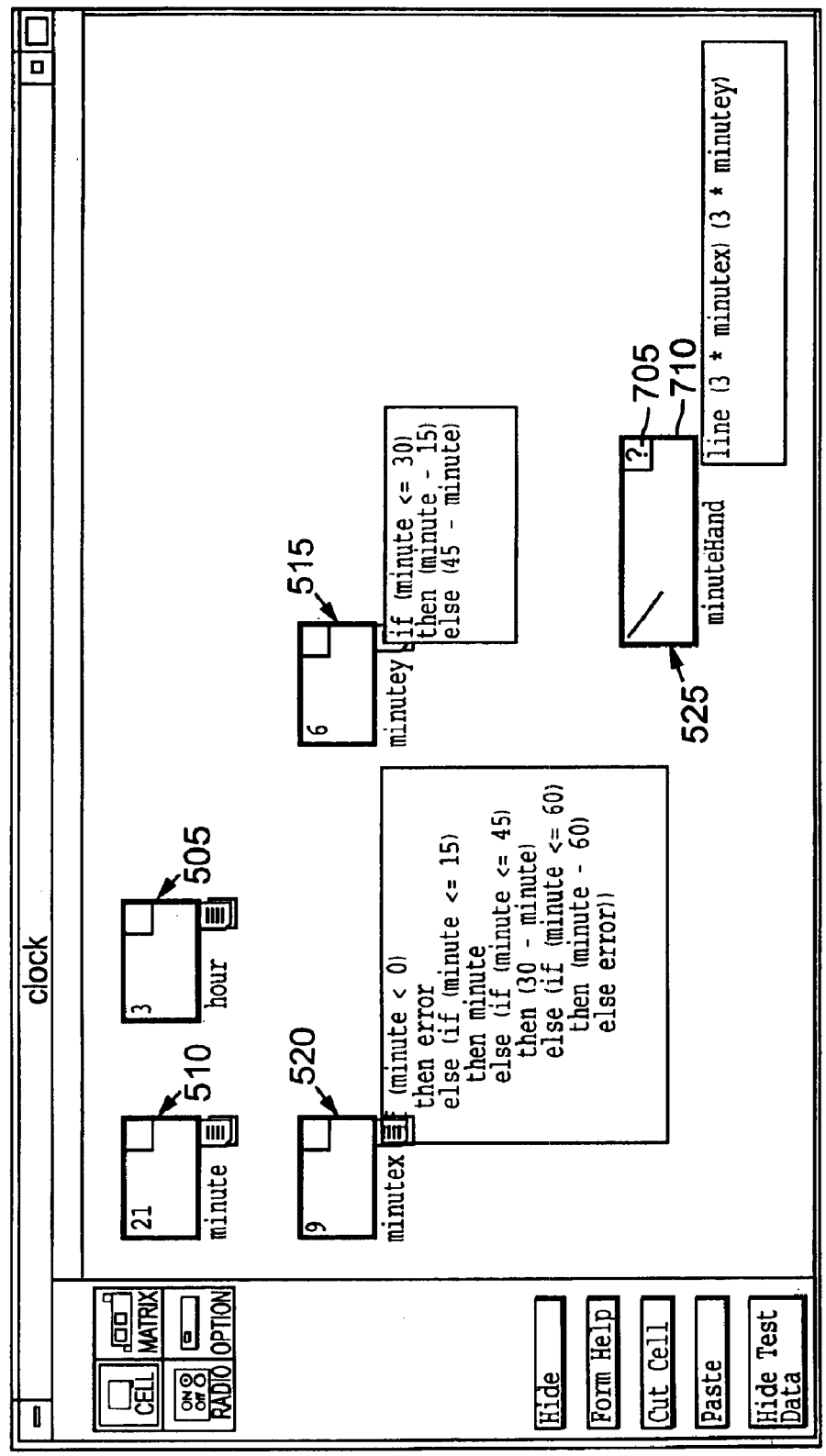
FIG. 7 shows the partial construction of the example spreadsheet in FIG. 5 after the user validates the minute-Hand cell according to the invention.

In the desktop clock programming scenario, suppose that the user looks at the values displayed on the screen and decides that the minuteHand cell contains the correct value. To document this fact, the user clicks on the validation tab in the upper right corner of that cell. As FIG. 7 shows, one immediately-visible result of this action is the appearance of a checkmark in the validation tab 705. If the user enters another input in cell minute 510, minuteHand's validation checkmark changes to a question mark (not shown in the figure), which means the current value has not been validated but some previously-displayed value has been. (Any evaluation engine must visit at least on-screen consumers of the new input to keep the displayed values up-to-date, so changing the checkmark to a question mark during these visits adds only O(1) to the cost of each.) The third possible appearance, a blank validation tab, means no validations have been done since the last formula change to C or to a non-input cell affecting C. Thus, the validation tab keeps the user apprised of which cells have been explicitly validated and which have not, given the current collection of formulas.

A finer-grained device for communicating testing status involves test adequacy. Whenever a du-association participates in the production of a validated value, the exercised flag for that du-association (the second item of data kept for each du-association in the .DUA set for the cell in whose formula the use occurs) is set to "true". A "testedness" measure, such as the percentage, is then calculated of the du-associations whose uses occur in the cell, that have been exercised. This percentage is used to determine the cell's border color on a continuum from red (untested) to blue (100% of the du-associations whose uses occur in the cell having been exercised). (In a black and white display system, the continuum is shown as light gray to black.) With each validation that exercises a previously unexercised du-association, the border becomes less red (darker in these figures), indicating a greater degree of "testedness" for that cell. This visual feedback appears in all cells that contributed to the computation of the value in the validated cell.

In the example shown in FIG. 7, after the user has validated cell minuteHand 525 by checking the validation tab 705, the border 710 of cell minuteHand 525 turns more blue, because some of the nodes and edges in the formula graph for cell minuteHand 525 have been adequately tested. The computation of minuteHand's 525 value involves two of the four du-associations that end in minuteY 515, two of the seven du-associations that end in minuteHand 525, and four of the 13 du-associations that end in minutex 520. Thus, after the user validates minuteHand 525, the cell borders are darkened using these fractions. Input cells are, by definition, fully exercised.

Figure 7A:
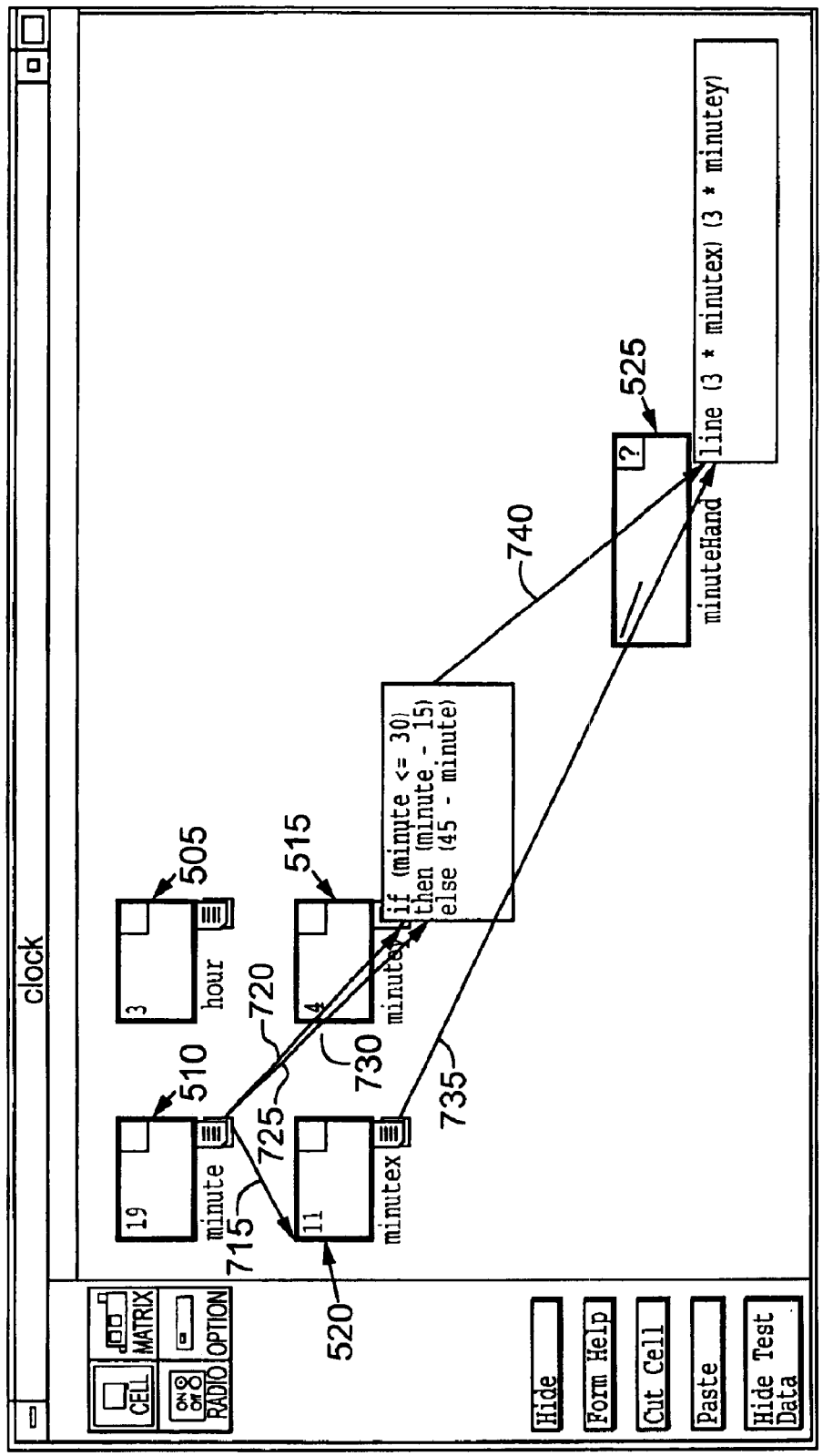
FIG. 7A shows the testedness measures of the du-associations of FIG. 7.

When borders are entirely blue, the user can see that each cell reference pattern (du-association) has been tested (i.e., executed with validation) at least once. As FIG. 7A shows, the user can also display arrows 715, 720, 725, 730, 735, and 740 that indicate cell reference patterns (du-associations). When formulas are showing, arrows point from definition to use (arrow 740). When a formula is not showing, the arrows pointing from or to definitions or uses, respectively, in that cell, join together (arrow 715). Arrows can also point from a definition to a cell, or from a cell to a use (all other arrows).

The cell reference pattern arrows 715, 720, 725, 730, 735, and 740 are colored using the same scheme as the borders, and thus, make explicit precisely which cell reference patterns still need to be tested. In the current embodiment, when formulas are showing, arrows pointing from definition to c-use will be in one of two states: untested or tested; arrows pointing from definition to p-use will be in one of three states: untested, partially tested, or fully tested. (The partially tested state occurs where only one branch of the if construct has been executed.) For example, in FIG. 7A, cell reference pattern arrows 730 and 735 are untested, cell reference pattern arrow 720 is partially tested, and cell reference pattern arrows 725 and 740 are fully tested. However, a person skilled in the art will recognize that, depending on the spreadsheet constructs, cell reference pattern arrow coloration can vary on a continuum from untested to tested. For example, a spreadsheet that allowed constructs similar to the switch construct of the C programming language could have more than just three testedness states. When a formula is not showing, arrows are colored like the borders of the cells to which they point.

Figure 8:
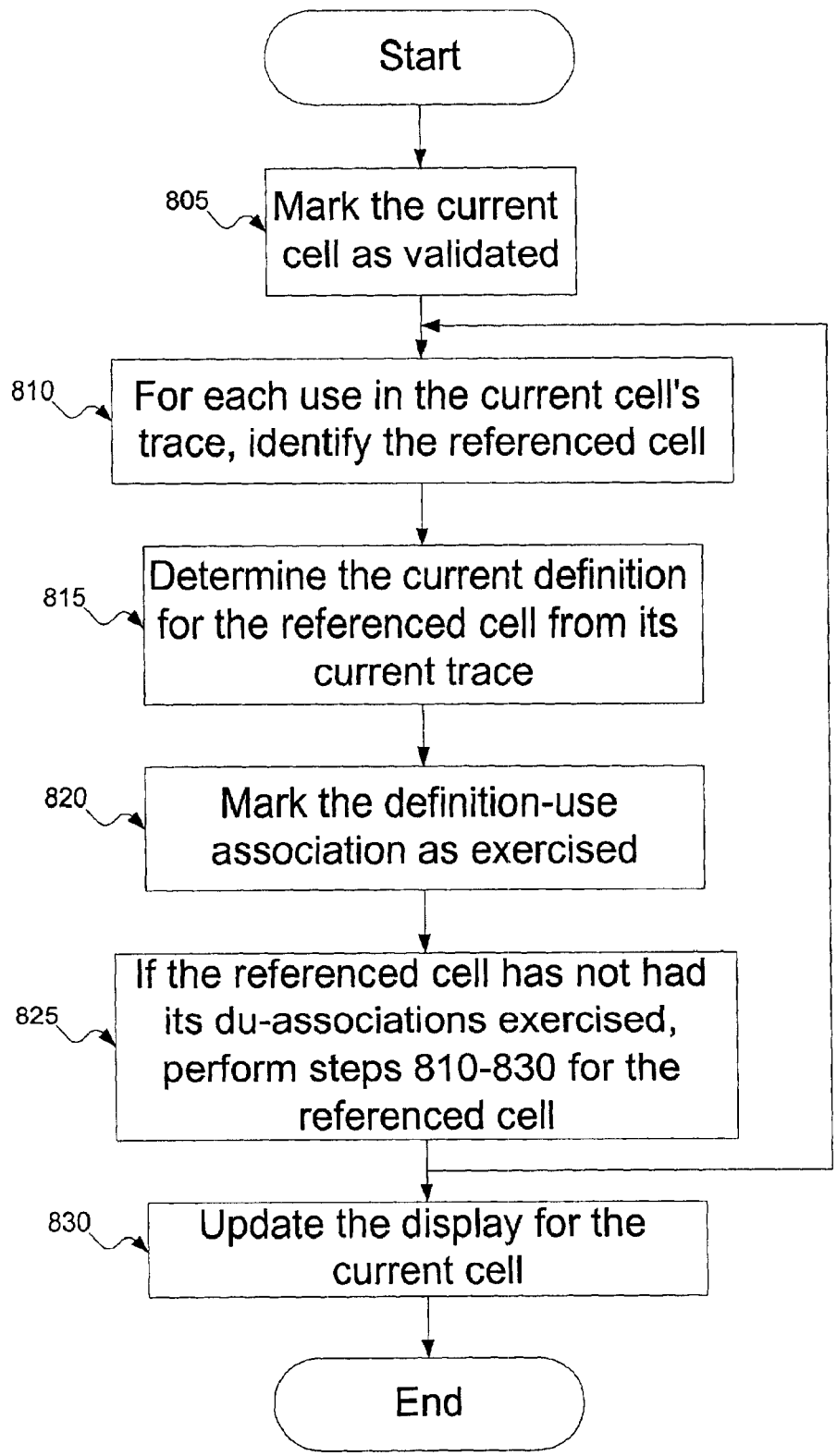
FIG. 8 shows a flowchart of the algorithm for "exercising" du-associations after the user validates a cell according to the invention.

Table 3 displays the algorithm Validate, which is invoked when the user displayed value. FIG. 8 shows a flowchart of algorithm Validate. The algorithm uses the static du-association information and execution traces, previously calculated and stored as discussed in the descriptions of Tasks 1 and 2, to calculate the du-associations that participate in the production of C's current value, and to update borders of participating cells. As the algorithm proceeds, it adds to stored .DUA data that indicates the du-associations that have been validated thus far. This coverage information is accumulated and retained across a succession of tests, even though cell execution traces change as subsequent tests are applied.

TABLE 3

1. algorithm Validate(C)
2. ValidatedID = ValidatedID + 1
3. C.ValTab = "checkmark"
4. ValidateCoverage(C)
5. procedure ValidateCoverage(C)
6. C.ValidatedID = ValidatedID
7. for each use u ∈ C.Trace do
8.    D = the cell referenced in u
9.    d = the current definition of D found in D.Trace
10.    C.DUA = C.DUA ∪ {((d, u), true)} − {((d, u), false)}
11.    if D.ValidatedID < ValidatedID then
12.       ValidateCoverage(D)
13. UpdateDisplay(C)

Variable ValidatedID, referenced in the algorithm, can be set to 0 when the spreadsheet environment is first activated. Then, when cells are created or added to the spreadsheet, their .ValidatedID fields are initialized to 0. On each invocation of validate, ValidatedID is incremented (line 1). The .ValidatedID fields for all cells visited are assigned this value of ValidatedID, which prevents duplicate visits to the same cell. By using an integer rather than a Boolean, and incrementing it on each invocation of the algorithm, the need to initialize the flag for all cells in the spreadsheet on each invocation is avoided. It is assumed that ValidatedID will not overflow, to simplify the presentation.

In lines 2–4 (step 805), the cell the user has identified as validated is marked accordingly and ValidatedID is updated. At line 6 (step 808), the validated cell's validation is updated. At line 7 (step 810), each use in the trace for the validated cell is considered. In lines 8–9 (step 815), the referenced cell is identified, as is the definition in the current trace for the referenced cell. Line 10 (step 820) marks the du-association exercised. Lines 11–12 (step 825) test to see if the referenced cell has been updated since the current cell was validated and, if not, recursively exercises the du-associations for the referenced cell. Finally, line 13 (step 830) updates the display for the current cell by changing the border color according to the percentage of du-associations for the current cell that have been exercised, and to reflect the validated status of the current cell.

The use of ValidatedID ensures that ValidateCoverage is called no more than once per cell, and that Validate terminates in a worst-case time proportional to the number of du-associations validated. Because the set of uses in a cell's trace corresponds to a set of definitions in that cell's direct producers, which in turn lead to that cell's indirect producers, the cost of validation is bounded by the number of direct and transitive producers of a cell. This is less than or equal to the cost of calculating the cell's value the first time (when no reusable values are present in the cache), but the algorithm is triggered by a user interaction that does not require evaluation, so, unlike the other algorithms presented, its cost cannot be masked by the cost of the evaluation process.

A generalization of this algorithm related to the approach of (Duesterwald92) uses slicing to locate the expressions that contribute to the computation of the validated output, and identifies the du-associations involved in the computation from that slice. This generalized approach is applicable to languages with recursion, iteration, and redefinitions of variables. In the absence of such features, the more efficient approach that presented here suffices.

Task 4: Adjusting Test Adequacy Information

So far, focus has been limited to how the methodology of the invention handles cell formulas as they are added to a spreadsheet. Another aspect of the methodology addresses the other basic edits possible with spreadsheets, namely, deleting a cell or changing a cell's formula. Changes to a constant-formula cell are equivalent to the application of a new test input (which may or may not be followed by validations by the user), and requires no action beyond that involved in recalculating execution traces as discussed under Task 2. Deletion of a cell is equivalent to modifying that cell's formula to BLANK. Thus, only modifications to non-constant formulas need be considered.

Suppose that the user has done quite a bit of testing, and has discovered a fault that requires a formula modification with far-reaching consequences. The user may believe that the spreadsheet is still fairly well tested, and not realize the extent to which the modification invalidates previous testing.

To address this lack of awareness, a system must immediately reflect the new test adequacy status of the spreadsheet whenever a cell is modified. In this context, the problem of interactive, incremental testing of spreadsheets resembles the problem of regression testing imperative programs, and one could adapt techniques for incremental dataflow analysis (e.g., (Marlowe90, Pollock89)) and incremental dataflow testing of imperative programs (e.g., (Gupta93, Harrold88, Rothermel94)). Such an approach would apply to spreadsheet languages in which cell references can be recursive or in which formulas contain iteration. In the absence of such features however, the more efficient approach presented here suffices.

To reflect the new test adequacy status of the spreadsheet whenever a cell is modified, the system must (1) update C's static du-association and dynamic execution trace information, and (2) update the exercised flags on all du-associations affected by the modification, allowing calculation and display of new border and arrow colors to reflect the new "testedness" status of the spreadsheet. Validation tab statuses on cells that were dependent on (consumers of) C must also be adjusted, changing all checkmarks to question marks if the cell retains any exercised du-associations after affected associations have been reset, or to blank if all the cell's exercised flags are now unset. (Because all of C's du-associations have been reset, the validation tab for C is changed to blank.) For example, in the completed Clock spreadsheet of FIGS. 2A–2B, if the user changes cell minutex's 215 formula, then the du-associations involving minutex 215, and the validation statuses for minutex 215, minuteHand 222, and theClock 210 must all be adjusted to blank. On the other hand, if the user changes value of minute 205, the validation statuses for cells minutex 215, minutey 216, hourx 217, houry 218, hourWithFraction 219, fraction 220, hourHand 221, minuteHand 222, and theClock 210 are adjusted to question marks or to blanks, depending on the cells' other du-associations' exercised statuses.

Figure 9:
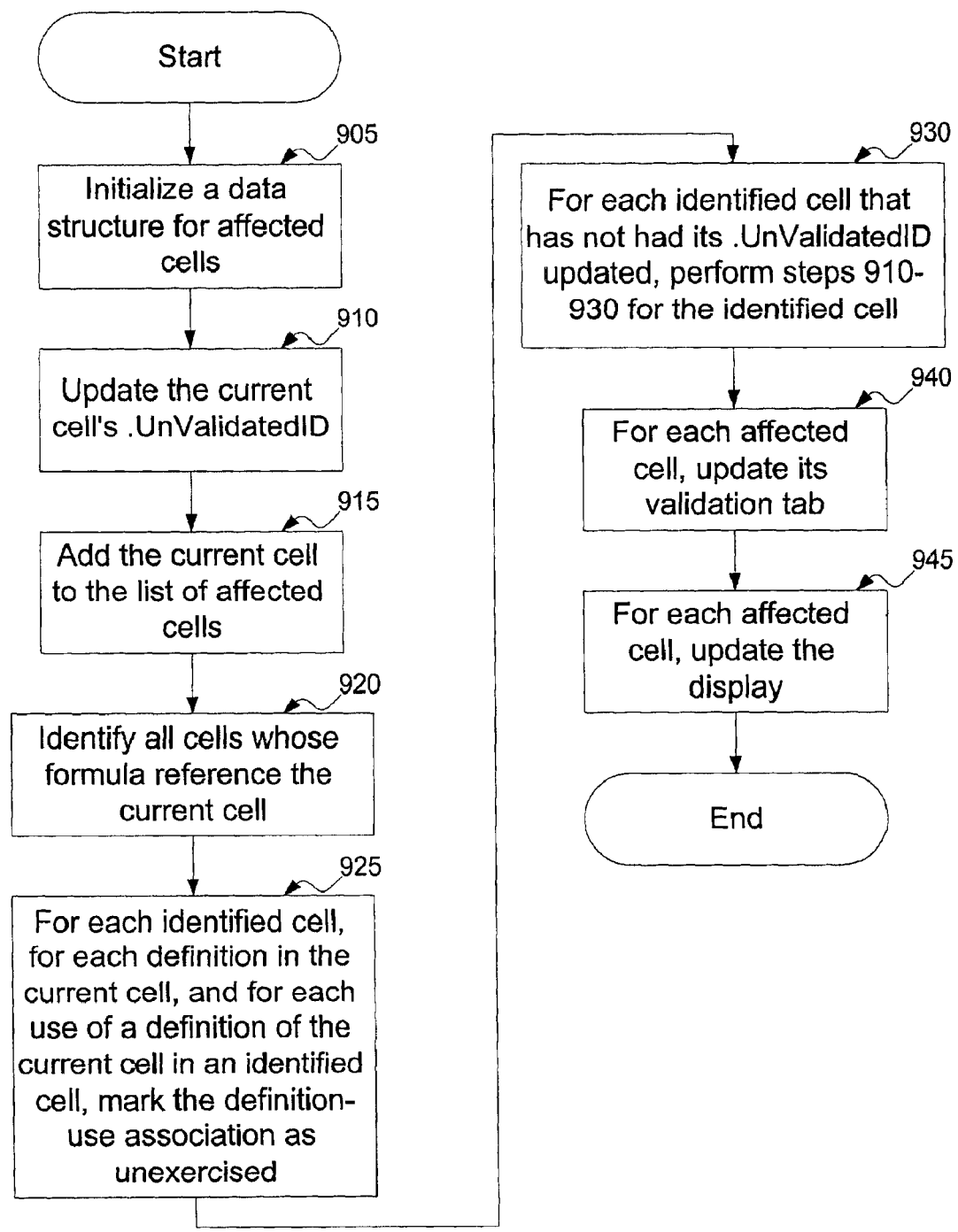
FIG. 9 shows a flowchart of the algorithm for "unexercising" du-associations after a cell is invalidated according to the invention.

The preferred embodiment handles item (2) first, removing the old information before adding the new. Let C be the modified cell. A conservative approach that recursively visits potentially affected cells is used. The algorithm, UnValidate, given in Table 4, is similar to Validate, but instead of using dynamic information to walk backward through producers, it uses static information to walk forward through consumers. FIG. 9 shows a flowchart of algorithm UnValidate. As the algorithm walks forward, it changes the exercised flag on each previously exercised du-association it encounters to "false", and keeps track of each cell visited in AffCells. On finishing the work for all the cells, the algorithm updates the border and arrow colors and validation tab for each cell in AffCells.

TABLE 4

1. algorithm UnValidate(C)
2. global AffCells = { }
3. UnValidatedID = UnValidatedID + 1
4. UnValidateCell(C)
5. for each cell D ∈ AffCells do
6.    UpdateValTab(D)
7.    UpdateDisplay(D)
8. procedure UnValidateCell(E)
9. E.UnValidatedID = UnValidatedID
10. AffCells = AffCells ∪ E
11. for each cell F ∈ E.DirectConsumers do
12.    for each definition d (of E) in E do
13.       for each ((d, u), true) ∈ F.DUA do
14.          F.DUA = F.DUA ∪ {((d, u), false)} − {((d, u), true)}
15.    if F.UnvalidatedID < UnValidatedID then
16.       UnValidateCell(F)

Variable UnValidatedID, referenced in the algorithm, can be set to 0 when the spreadsheet environment is first activated. Then, when cells are created or added to the spreadsheet, their .UnValidatedID fields are initialized to 0. On each invocation of UnValidate, UnValidatedID is incremented (line 3). The .UnValidatedID fields for all cells visited are assigned this value of UnValidatedID, which prevents duplicate visits to the same cell. By using an integer rather than a Boolean, and incrementing it on each invocation of the algorithm, the need to initialize the flag for all cells in the spreadsheet on each invocation is avoided. It is assumed that UnValidatedID will not overflow, to simplify the presentation.

In line 2 (step 905), a data structure for storing the affected cells is initialized. This data structure may be a set, a list, or any other convenient storage mechanism. In line 3, the variable UnValidatedID is incremented. In line 4, the current cell has its du-associations marked as unexercised. This process comprises steps 910–930. In line 9 (step 910), the current cell is marked as no longer valid. In line 10 (step 915), the current cell is added to the data structure storing the affected cells. In lines 11–14, for each cell that depends on the current cell (step 920), the consuming cell's du-association set is updated so that each du-association for the consuming cell that uses a definition of the current cell is marked as unexercised (step 925). Lines 15–16 (step 930) test to see if the consuming cell has been updated since the current cell was invalidated and, if not, recursively marks as unexercised the du-associations for the consuming cell. Finally, lines 5–7 update the validation tabs for the affected cells (step 935) and update the display for the affected cells. Updating the display includes changing the border and arrow colors according to the percentage of du-associations for the affected cells, and to reflect the validated status of the affected cells.

At this point, the static du-association and dynamic trace information stored with C can be updated. First, all stored static du-associations involving C are deleted; these du-associations are found in the information stored for C and for cells in C.DirectConsumers. This deletion also guarantees that du-associations that end in C are no longer marked "exercised." Having removed the old du-associations, it is necessary only to re-invoke CollectAssoc as described earlier to add new associations. Finally, stored execution traces are automatically updated via the evaluation engine as described earlier.

Because UnValidate's processing is consumer-driven, then as with Task 1, the cell visits required by it are already required for display and value cache maintenance under eager evaluation and under LazyEM, but not necessarily by other evaluation engines that might be possible. However, in the cases of eager evaluation and LazyEM, the time cost of the algorithm increases only by a constant factor the cost of other work being performed by the environment when a formula is edited.

Task 5: Batch Computation of Information

Test information can be saved when a spreadsheet is saved. Then, when the spreadsheet is reloaded later for further development, it is not necessary to analyze it exhaustively to continue the testing process. Still, there are some circumstances in which it might be necessary to calculate static du-association information for a whole spreadsheet or section of a spreadsheet: for example, if the user does a block copy/paste of cells, or imports a spreadsheet from another environment that does not accumulate the necessary data. One possible response to such an action is to iteratively call the CollectAssoc algorithm presented earlier for each cell in the new spreadsheet section. This approach, however, may visit cells more times than necessary.

Figure 10:
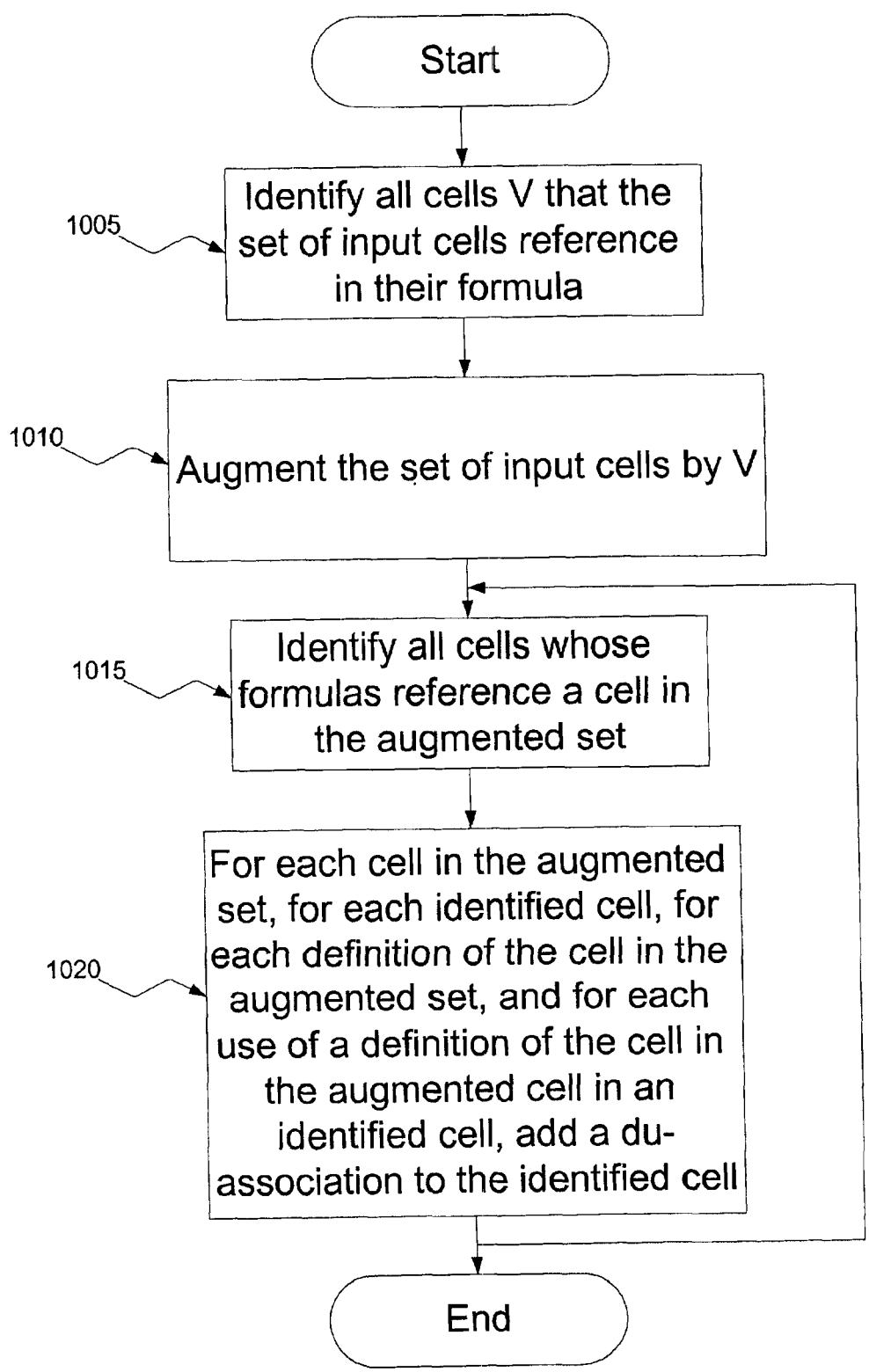
FIG. 10 shows a flowchart of the algorithm for batch-collecting du-associations for a group of cells according to the invention.

Table 5 presents a more efficient approach, BatchCollectAssoc, that takes an entire set U of cells as input, collects (from the spreadsheet environment) the set V of cells that are direct producers of cells in U, and then makes a single pass over V and U to gather du-associations. FIG. 10 shows a flowchart of algorithm BatchCollectAssoc. Although this algorithm has the same worst-case runtime as CollectAssoc, when there are interrelationships among the cells, its set-driven approach allows it to eliminate some duplicated visits to cells.

TABLE 5

1. algorithm BatchCollectAssoc(U)
2. V = { }
3. for each cell C ∈ U do
4.    V = V ∪ C.DirectProducers
5. for each cell C ∈ V ∪ U do
6.    for each cell D ∈ C.DirectConsumers do
7.      for each definition d (of C) ∈ C.LocalDefs do
8.        for each use u (of C) ∈ D.LocalUses do
9.          D.DUA = D.DUA ∪ {((d,u), false)}

In lines 2–4 (step 1005), every cell that is a direct producer of a cell in the input set (u) is identified. These newly identified cells augment the input set for the remainder of the algorithm (step 1010). In lines 5–9, each consumer cell of any definition in the augmented set is identified (step 1015), and an unexercised du-association is added to the using consumer cell (step 1020).

Another approach to this problem would be to propagate definitions forward, and uses backwards, across flow and cell dependence edges in the CRG. This approach applies to spreadsheet languages in which cell references can be recursive or in which formulas contain iteration or redefinitions of variables. In the absence of such features, the more efficient approach presented here suffices.

Visual Representation Devices

The visual representation of testedness used in this document reflects three constraints on the visual representation that are believe to be important for integration into spreadsheet environments. These constraints are in part drawn from literature on cognitive aspects of programming (Green96, Yang97). The constraints upon the visual representation are that first, the visual representation should be frugal enough of screen space that it does not significantly decrease the number of cells that can be displayed. Second, the visual representation should maintain consistency with the current formulas in the visible cells. Third, the visual representation devices should be accessible to as wide an audience as possible, including those with mild visual impairments.

The prototype used to create the figures in this document used the following representation devices to satisfy these constraints. To satisfy the first constraint, testedness information is enclosed with cell border colors, rather than displaying it in textual summaries, and explicit validation status is enclosed with the presence or absence of checkmarks or question marks. However, a person skilled in the art will recognize that other mechanisms can be used to convey this information.

To satisfy the second constraint, the display of testedness is automatically updated whenever any action by the user or by the system changes testedness status. Thus, outdated testedness information is never left on the screen.

To satisfy the third constraint, border colors along a red-blue continuum are selected to be used against the usual white background for spreadsheets. The colors red and blue are easily discriminated (Christ75) and because, due to the physiology of the human eye, red stands out while blue recedes (Shneiderman98), they draw users' attention to untested cells. The blue can also be desaturated to enhance this effect. Also, because red and blue differ in two of the three RGB components of screen color, this device should be usable by some red-deficient or blue-deficient users (Murch84); the gray-black continuum shown in the drawings is also an option for color-deficient users.

An additional visual device that can be employed to emphasize the differences among the three categories of no coverage validated, partial coverage validated, and all coverage validated, is to use a quadratic formula that separates the 0% and 100% colors from the partial coverage colors. Of course, while this furthers the goal of drawing overall attention to untested cells, exact degree of coverage for a particular cell is not likely to be readily discernable by most users. An additional optional thermometer-like indicator can be used along a border for when a user wishes to see more exact information about a cell's coverage.

In FIG. 12, the color red is represented by a fill pattern of diagonal lines running from the top right to the bottom left. The color blue is represented by a fill pattern of diagonal lines running from the top left to the bottom right. Thus, cell 1235 is as yet completely untested, cell 1240 is partially tested, and cell 1245 is completely tested.

Figure 14:
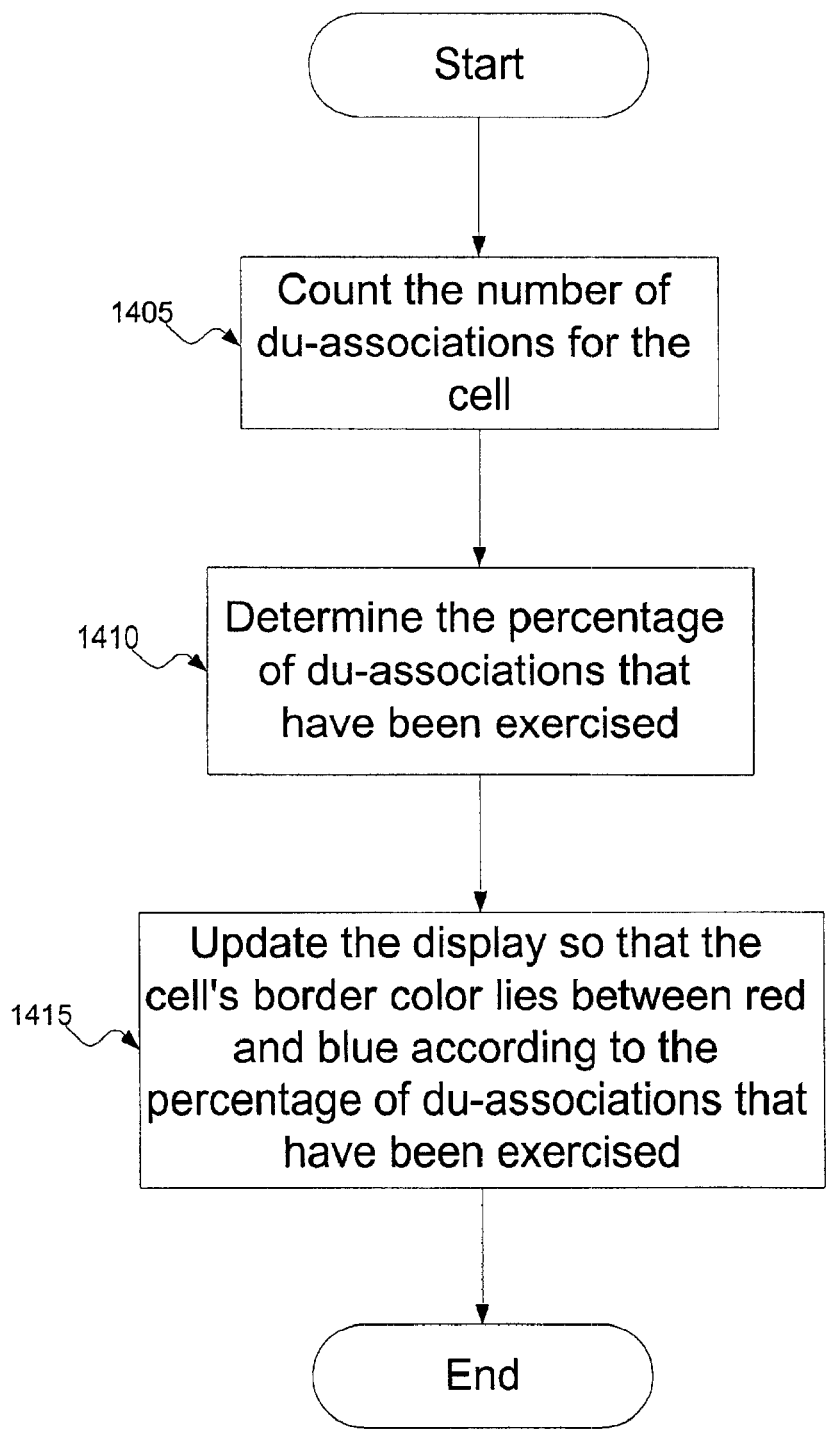
FIG. 14 shows a flowchart of the algorithm for providing the user with visual feedback of the testedness measure for a cell according to the invention.

With reference to FIG. 14, the testedness measure is visually represented as follows: At step 1405, the total number of du-associations for the cell is determined. Then at step 1410, the percentage of exercised du-associations for the cell is calculated. Finally, at step 1415, the border color for the cell is changed to reflect the testedness measure.

III. Empirical Results

To empirically test whether du-adequate testing will reveal a reasonable percentage of faults in spreadsheets, a prototype of the preferred embodiment within the Forms/3 environment has been implemented. The prototype incorporates the algorithms described herein. The screen shots used in the drawings are from this prototype. The prototype was exercised to perform an empirical study of the effectiveness of du-adequate test suites at detecting faults.

A. Methodology

This study employed eight Forms/3 spreadsheets (see Table 6) from experienced Forms/3 users. Three of the spreadsheets (TimeCard, Grades, and Sales) are modeled after spreadsheets written in commercial spreadsheet systems, and the others are spreadsheets written in a research spreadsheet language: two are simple simulations (FitMachine and MicroGen), one a graphical desktop clock (Clock), one a number-to-digits splitter (Digits), and the last a quadratic equation solver (Solution).

TABLE 6

| Spreadsheet | Expression | Du-associations | Version | Test Pool Size | Average Test Suite Size |
| --- | --- | --- | --- | --- | --- |
| Clock | 33 | 64 | 7 | 250 | 11.3 |
| Digits | 35 | 89 | 10 | 230 | 22.7 |
| FitMachine | 33 | 121 | 11 | 367 | 30.2 |
| Grades | 61 | 55 | 10 | 80 | 9.8 |
| MicroGen | 16 | 31 | 10 | 170 | 10.4 |
| Sales | 30 | 28 | 9 | 176 | 10.4 |
| Solution | 20 | 32 | 11 | 99 | 12.0 |
| TimeCard | 33 | 92 | 8 | 240 | 16.7 |

Seven users experienced with Forms/3 and commercial spreadsheets were asked to insert faults into the subject spreadsheets which faults, in their experience, are representative of faults found in spreadsheets. A Forms/3 user who had no knowledge of these specific faults was then asked to generate a pool of tests for each of the base versions of the subject spreadsheets. For each base spreadsheet, this user first created tests of spreadsheet functionality. He then executed these tests on the base spreadsheet to determine whether together they exercised all executable du-associations in the spreadsheet, and generated additional tests to ensure that each executable du-association in the spreadsheet was exercised by at least five tests in the test pool. He also verified that for all tests, validated cells in the base version produced correct values.

These test pools were used to create du-adequate test suites for the subject spreadsheets. First, for each test t in the test pool, the du-associations exercised by t were determined. Then test suites were created by randomly selecting a test, adding it to the test suite only if it added to the cumulative coverage achieved by tests in that suite thus far, and repeating this step until coverage was du-adequate. Between 10 and 15 du-adequate test suites were generated for each of the subject spreadsheets; Table 6 lists the average sizes of these test suites.

Each base version S was known to produce correct output, and only a single fault was inserted in each faulty version. This made it possible to determine whether a fault had been revealed in a modified version S' by a test suite T simply by comparing the validated output of S (the output which, for that test, was confirmed by the tester to be correct) for each test t in T with the validated output of S' on t. Thus, to obtain fault detection results, for each base version S, with its faulty versions $S_1 \ldots S_k$ and universe U of test suites, for each test suite T in U:

1. all tests in T on S were run, saving outputs,
2. for each modified version $S_i$ of S:
   (a) all tests in T on $S_i$ were run, saving outputs,
   (b) T was recorded as fault-revealing for $S_i$ if and only if the output of the validated cell for some test t in T executed on $S_i$ differed from the output of that cell when t was executed on S.

B. Data and Analysis

Figure 11:
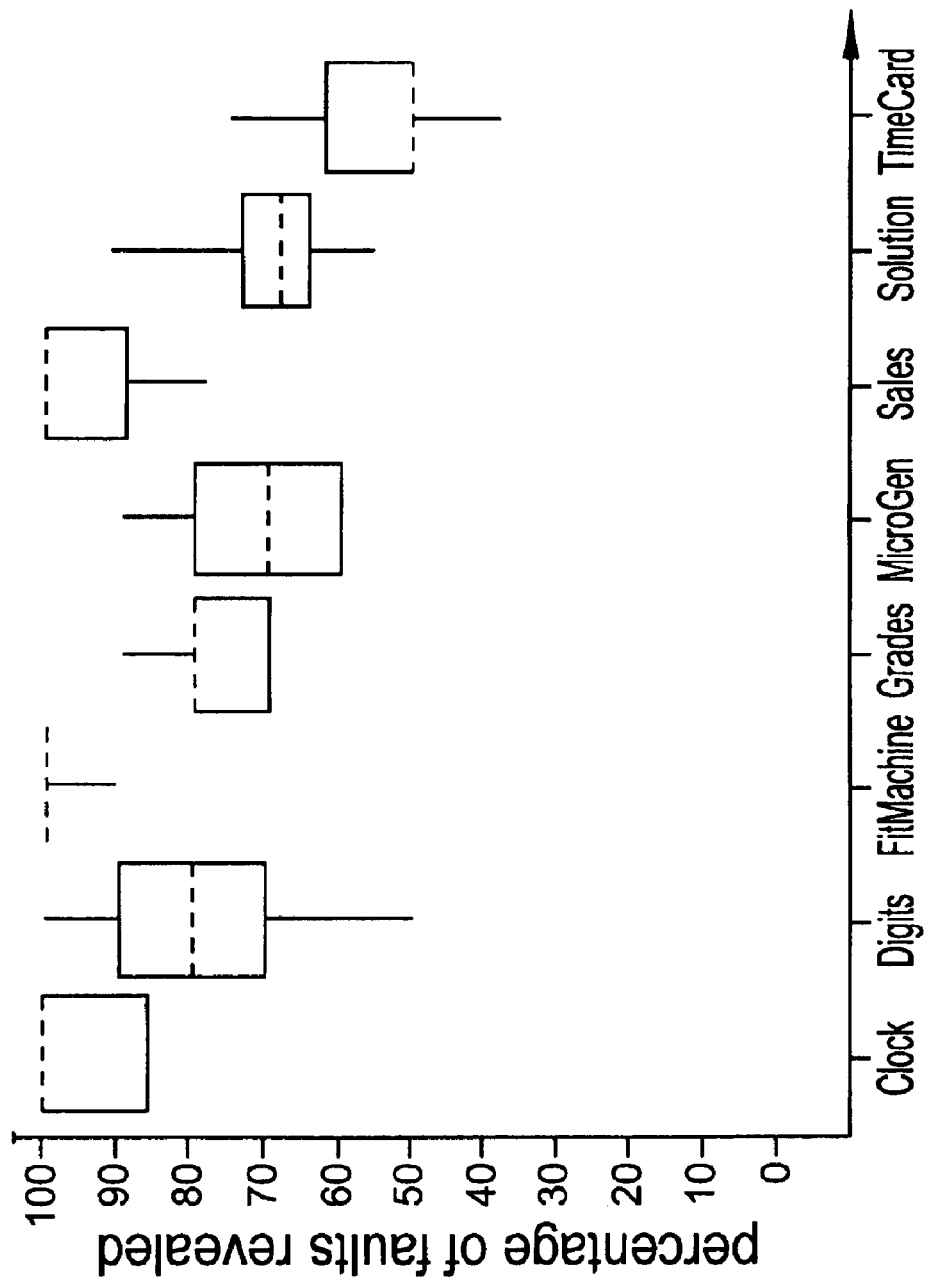
FIG. 11 shows the percentage of faults detected by du-association test suites for a variety of sample spreadsheets.

FIG. 11 displays fault detection data, using box plots to show, for each spreadsheet, the percentage of faults detected by the du-adequate test suites. Dashed crossbars represent median percentages of faults detected over the set of test suites for the spreadsheet. The boxes show the ranges of percentages in which half of the fault detection results occurred. The whiskers that extend below and above boxes indicate ranges over which the lower 25% and upper 25% of the data, respectively, occurred.

The overall average (mean) percentage of faults detected for all spreadsheets, faulty versions, and test suites in the study was 81%. Fault detection varied across spreadsheets, but in all but one case (on two versions of TimeCard) exceeded 50%. Although differences in experimental instrumentation make comparisons difficult, this fault-detection effectiveness is comparable to or better than the effectiveness demonstrated by the all-uses criterion in studies of imperative programs (Frank193, Hutchins94, Offutt96, Weyuker93, Wong95).

One additional cost factor of dataflow testing to consider involves static du-associations that are recognized by the testing system's analysis, but that are nonexecutable. On average, 11.65% of the static du-associations calculated by the algorithms for the subject spreadsheets were nonexecutable. This rate is lower than the average rates of 26% and 27% observed in two studies of imperative programs reported in (Weyuker93). Nevertheless, the presence of these du-associations could be difficult to explain to users. Future work will consider whether techniques for determining (approximately) path feasibility (e.g., (Clarke76)) can operate cost-effectively behind the scenes to address this problem.

In related empirical work performed involving human subjects (detailed in (Cook99)), several measurements of users' testing effectiveness and efficiency were significantly higher for subjects using Forms/3 supplemented by this testing methodology than for those using Forms/3 without the testing methodology.

IV. CONCLUSION

Due to the popularity of commercial spreadsheets, spreadsheet languages are being used to produce software that influences important decisions. Furthermore, due to recent advances from the research community that expand its capabilities, the use of this paradigm is likely to continue to grow. The fact that such a widely-used and growing class of software often has faults should not be taken lightly.

To address this issue, the methodology of the present invention brings some of the benefits of formal testing to spreadsheet software. Important to its appropriateness for the spreadsheet paradigm are four features. First, the methodology accommodates the dependence-driven evaluation model, and is compatible with evaluation engine optimizations, such as varying evaluation orders and value caching schemes. Second, the set of algorithms used is structured such that their work can be performed incrementally, and hence can be tightly integrated with the highly interactive environments that characterize spreadsheet programming. Third, the algorithms are reasonably efficient given their context, because the triggers that require immediate response from most of the algorithms also require immediate response to handle display and/or value cache maintenance, and the same data structures must be traversed in both cases. The only algorithm that adds more than a constant factor is Validate, whose cost is the same order as the cost of recalculating the cell being validated. Finally, the methodology does not require user knowledge of testing theory; instead, the algorithms track the "testedness" of the spreadsheet incrementally, and use visual devices to call attention to insufficiently tested interactions.

Empirical results suggest that the methodology can achieve fault detection results comparable to those achieved by analogous techniques for testing imperative programs. Further experiments involving human subjects, showed that users were both significantly more effective and significantly more efficient at testing when supported by the methodology than when not supported by it. These results are important, because they imply that the potential benefit of this approach to spreadsheet users may be substantial.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. In a computerized spreadsheet which includes multiple spreadsheet cells, a method for testing a first spreadsheet cell containing a first formula, the method comprising:
   creating a first formula graph for the first formula of the first spreadsheet cell, the first formula graph containing nodes representing predicates and definitions in the first formula of the first spreadsheet cell and edges representing execution flow between the nodes of the first formula graph;
   collecting one or more du-associations for the first spreadsheet cell, where each du-association relates a node in a second formula graph for a second formula of a second spreadsheet cell with one of a node or edge in the first formula graph of the first spreadsheet cell;
   tracking an execution trace for the first spreadsheet cell, where the execution trace comprises a sequence of nodes in the first formula graph of the first spreadsheet cell and a set of edges from the first formula graph connecting pairs of the nodes in the execution trace sequence; and
   after receiving a user validation of the first spreadsheet cell, marking as exercised the du-associations containing a node or edge in the execution trace for the first spreadsheet cell.

2. A method according to claim 1 further comprising repeating the steps of creating, collecting, tracking, and marking for each second spreadsheet cell with an exercised du-association so that any du-associations for each second spreadsheet cell are marked as exercised after at least one of the first spreadsheet cell and second spreadsheet cell has been user-validated.

3. In a computerized spreadsheet containing a plurality of spreadsheet cells, a method for testing a first spreadsheet cell containing a formula, the method comprising:
   collecting one or more test elements for the first spreadsheet cell;
   tracking an execution trace of the first spreadsheet cell; and
   marking as exercised a subset of the test elements that participated in the execution trace for the first spreadsheet cell.

4. A method according to claim 3 further comprising:
   identifying all other spreadsheet cells upon which the first spreadsheet cell depends; and
   for each other spreadsheet cell, repeating the steps of collecting, tracking, and marking.

5. A method according to claim 3 wherein collecting one or more test elements includes collecting one or more du-associations for the first spreadsheet cell.

6. A method according to claim 5 wherein one or more du-associations are collected as the formula is entered into the first spreadsheet cell.

7. A method according to claim 5 wherein collecting one or more du-associations includes:
   identifying all other cells used in the formula of the first spreadsheet cell;
   identifying all definitions of the other cells that are used in the formula of the first spreadsheet cell; and
   creating a du-association between each definition of the other cells and each use of the definition in the formula of the first spreadsheet cell.

8. A method according to claim 3 wherein tracking an execution trace includes tracking which parts of the formula for the first spreadsheet cell have been exercised.

9. A method according to claim 8 wherein marking as exercised a subset of the test elements includes marking du-associations for the first spreadsheet cell that were exercised by the execution trace for the first spreadsheet cell, where each du-association includes a definition of a second cell and a use of the definition of the second cell in the formula for the first spreadsheet cell.

10. A method according to claim 9 wherein marking du-associations includes marking as exercised each du-association whose use is part of the formula for the first spreadsheet cell that has been executed.

11. A method according to claim 3 wherein marking as exercised a subset of the test elements includes:
    receiving a user validation of the first spreadsheet cell; and
    after receiving the user validation of the first spreadsheet cell, marking as exercised the subset of test elements that participated in the execution trace for the first spreadsheet cell.

12. A method according to claim 11 further comprising:
    identifying all other spreadsheet cells upon which the first spreadsheet cell depends; and
    for each other spreadsheet cell, repeating the steps of collecting, tracking, and marking so that any test elements for each other spreadsheet cell are marked as exercised independently of whether each other spreadsheet cell has been user-validated.

13. A method according to claim 11 wherein receiving a user validation includes having a user click on a validation tab for the first spreadsheet cell.

14. A method according to claim 11 wherein receiving a user validation includes:
    storing a validation symbol for the first spreadsheet cell; and
    displaying the validation symbol for the first spreadsheet cell.

15. A method according to claim 14 wherein displaying the validation symbol includes displaying the validation symbol for the first spreadsheet cell in a validation tab.

16. A method according to claim 3 further comprising:
    discarding the test elements for the first spreadsheet cell after a user changes the formula for the first spreadsheet cell; and
    repeating the steps of collecting, tracking, and marking for the first spreadsheet cell.

17. A method according to claim 16 wherein discarding the test elements for the first spreadsheet cell includes:
    identifying all other cells in the spreadsheet that depend on the first spreadsheet cell; and
    marking as unexercised all test elements for the identified cells that use a definition of the first spreadsheet cell.

18. A method according to claim 17 wherein marking as unexercised all test elements for the identified cells includes invalidating a user validation for the identified cells.

19. A method according to claim 18 wherein invalidating a user validation includes changing a validation symbol representing a validated spreadsheet cell for the identified cells to a validation symbol representing uncertainty for the identified cells.

20. A method according to claim 19 wherein invalidating a user validation includes displaying the validation symbol representing uncertainty for the identified cells.

21. A method according to claim 20 wherein displaying the changed validation symbol includes displaying the validation symbol representing uncertainty for the identified cells in a validation tab.

22. A method according to claim 19 wherein:
the validation symbol representing a validated spreadsheet cell is a checkmark; and
the validation symbol representing uncertainty is a question mark.

23. A method according to claim 18 wherein invalidating a user validation includes removing a validation symbol representing a validated spreadsheet cell for the identified cells.

24. A method according to claim 16 wherein discarding the test elements for the first spreadsheet cell includes invalidating a user validation for the first spreadsheet cell.

25. A method according to claim 24 wherein invalidating a user validation includes removing a validation symbol representing a validated spreadsheet cell for the first spreadsheet cell.

26. A method according to claim 25 wherein:
the validation symbol representing a validated spreadsheet cell is a checkmark.

27. A method according to claim 3 further comprising marking as unexercised a subset of the test elements for the first spreadsheet cell that are affected by a change in the formula for the first spreadsheet cell.

28. A method according to claim 3 further comprising providing the user with an indication of whether the first spreadsheet cell has been completely tested.

29. A method according to claim 3 further comprising providing the user with an indication of how completely the first spreadsheet cell has been tested.

30. A method according to claim 3 wherein the test elements are chosen from the group consisting of du-associations, node identifications, edge identifications, and cell identifications.

31. A method according to claim 3 further comprising selecting the first spreadsheet cell from the plurality of spreadsheet cells.

32. A method according to claim 3, the method further comprising:
using the test elements and the subset of the test elements, calculating a testedness measure of the test elements that have been exercised; and
providing the user with an indication of the testedness measure.

33. A method according to claim 32 wherein providing the user with an indication of the testedness measure includes providing the user with visual feedback of the testedness measure.

34. A method according to claim 33 wherein providing the user with visual feedback includes coloring a border of the spreadsheet cell, where the color chosen indicates the testedness measure.

35. A method according to claim 34 wherein the color chosen to indicate the testedness measure varies between red and blue, the color red representing a 0% testedness percentage and the color blue representing a 100% testedness percentage.

36. A method according to claim 32 further comprising changing the testedness measure based on a second execution trace.

37. A method according to claim 36 further comprising updating the indication of the testedness measure as the testedness measure changes.

38. A method according to claim 3, the method further comprising:
selecting one of the one or more test elements for the spreadsheet cell;
calculating a testedness measure of the selected test element; and
providing the user with an indication of the testedness measure of the selected test element.

39. A method according to claim 38 wherein providing the user with an indication of the testedness measure includes providing the user with visual feedback of the testedness measure of the selected test element.

40. A method according to claim 39 wherein providing the user with visual feedback of the testedness measure of the selected test element includes coloring an arrow representing the selected test element, where the color chosen indicates the testedness measure.

41. A method according to claim 40 wherein the color chosen to indicate the testedness measure varies between red and blue, the color red representing a 0% testedness percentage and the color blue representing a 100% testedness percentage.

42. A method according to claim 38 further comprising changing the testedness measure of the selected test element based on a second execution trace.

43. A method according to claim 42 further comprising updating the indication of the testedness measure as the testedness measure changes.

44. A computer-readable medium containing a testing program to support testing, in a computerized spreadsheet, a spreadsheet cell containing a formula, the testing program comprising:
a test element data structure for storing a set of one or more test elements for the spreadsheet cell;
a trace data structure for storing an execution trace of the spreadsheet cell; and
a subroutine operable to software mark as exercised any test elements that participated in the execution trace.

45. A testing program according to claim 44 further comprising a subroutine operable to update the test element data structure as the formula for the spreadsheet cell changes.

46. A testing program according to claim 44 further comprising a subroutine operable to update the trace data structure as any cell upon which the spreadsheet cell depends changes.

47. A testing program according to claim 44 further comprising:
a subroutine operable to identify all other spreadsheet cells upon which the spreadsheet cell depends; and
a subroutine operable to update the test element data structure for each other spreadsheet cell.

48. A testing program according to claim 44 wherein each test element includes:

a definition reference to a definition of a second cell;

a use reference to a use of the definition reference of the second cell in the formula of the spreadsheet cell; and a du-association between the definition reference and the use reference.

49. A testing program according to claim 44 further comprising a validation structure that allows a user to mark the spreadsheet cell as validated.

50. A testing program according to claim 49 wherein the validation structure changes from a checkmark to a question mark when the formula of the spreadsheet cell changes.

51. A testing program according to claim 49 wherein the validation structure changes from a checkmark to a blank when the formula of the spreadsheet cell changes.

52. A system for testing a spreadsheet cell in a spreadsheet on a computer system, the system comprising:

a set of one or more test elements for the spreadsheet cell;

an execution trace of the spreadsheet cell; and a marking unit to mark as exercised test elements that participated in the execution trace.

53. A system according to claim 52 further comprising:

a dependency identification unit to identify all other spreadsheet cells upon which the spreadsheet cell depends; and a test element update unit to update the test element data structure for each other spreadsheet cell.

54. A system according to claim 52 wherein each test element includes:

a definition reference to a definition of a second cell;

a use reference to a use of the definition reference of the second cell in the formula of the spreadsheet cell; and a du-association between the definition reference and the use reference.

55. A system according to claim 52 further comprising a validation structure that allows a user to mark the spreadsheet cell as validated.

56. A system according to claim 55 wherein the validation structure is constructed and arranged to change from a checkmark to a question mark when the formula of the spreadsheet cell changes.

* * * * *

UNITED STATES PATENT AND TRADEMARK OFFICE
CERTIFICATE OF CORRECTION

PATENT NO. : 6,948,154 B1
APPLICATION NO. : 09/438084
DATED : September 20, 2005
INVENTOR(S) : Rothermel et al.

It is certified that error appears in the above-identified patent and that said Letters Patent is hereby corrected as shown below:

On Title Page
Item 56
  Page 2, column 1, line 15, "E.H.Chi P. Barry" should be changed to --E.H. Chi, P. Barry --
Page 2, column 1, last line, "Huitchins94" should be changed to -- Hutchins94--.
Page 2, column 2, line 24, "user interface" should be changed to -- user interfaces --.
Page 2, column 2, line 38, "spreadsheet" should be changed to -- spreadsheet --.
Page 2, column 2, line 55, "Rothemel" should be changed to -- Rothermel --.
Page 3, column 1, line 1, remove the space in between "B." and "Shneiderman".
Page 3, column 1, line 2, "(Schneiderman98)" should be changed to --(Shneiderman98) --.
Page 3, column 2, line 4, "Converence" should be changed to -- Conference --.
Page 3, column 2, line 9, "Interantional" should be changed to -- International --.
Page 3, line 14, "representation" should be changed to -- representations --.
Column 1, line 45, "day-to-ay" should be changed to -- day-to-day --.
Column 2, line 1, "Frank 88" should be changed to -- Frank 188 --.
Column 7, line 29, "given t" should be changed to -- given t --.
Column 11, line 40, "Sec (Burnett98a)" should be changed to -- See (Burnett98a) --.
Column 15, line 57, "changes value" should be changed to -- changes the value --.

Signed and Sealed this

Eighteenth Day of December, 2007

JON W. DUDAS
*Director of the United States Patent and Trademark Office*